(12) United States Patent
Uchida et al.

(10) Patent No.: US 8,130,453 B2
(45) Date of Patent: Mar. 6, 2012

(54) ZOOM LENS SYSTEM, INTERCHANGEABLE LENS APPARATUS AND CAMERA SYSTEM

(75) Inventors: Tsuneo Uchida, Chiba (JP); Nobuyuki Adachi, Tokyo (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 12/694,689

(22) Filed: Jan. 27, 2010

(65) Prior Publication Data

US 2010/0195218 A1    Aug. 5, 2010

(30) Foreign Application Priority Data

Jan. 30, 2009  (JP) ................................. 2009-020095

(51) Int. Cl.
  *G02B 15/14* (2006.01)
(52) U.S. Cl. ..................................................... 359/688
(58) Field of Classification Search .................. 359/676, 359/677, 683, 684, 686, 688; 348/240.99–240.3, 348/335–369; 396/72–88
  See application file for complete search history.

(56) References Cited

U.S. PATENT DOCUMENTS

| | | | | |
|---|---|---|---|---|
| 5,717,526 | A * | 2/1998 | Ohtake | 359/683 |
| 6,002,527 | A * | 12/1999 | Ohtake | 359/683 |
| 6,055,114 | A | 4/2000 | Ohtake | |
| 6,147,810 | A | 11/2000 | Misaka | |
| 6,166,863 | A | 12/2000 | Ohtake | |
| 6,215,599 | B1 * | 4/2001 | Ohtake | 359/688 |
| 6,229,962 | B1 | 5/2001 | Imamura | |
| 6,266,189 | B1 | 7/2001 | Konno et al. | |
| 6,285,502 | B1 | 9/2001 | Konno et al. | |
| 6,882,369 | B1 | 4/2005 | Ito | |
| 2005/0162541 | A1 | 7/2005 | Ito | |
| 2005/0219708 | A1 | 10/2005 | Shibayama et al. | |
| 2005/0275949 | A1 | 12/2005 | Fujimoto et al. | |
| 2006/0203356 | A1 | 9/2006 | Fujimoto et al. | |
| 2006/0215279 | A1 | 9/2006 | Shibayama | |
| 2006/0221464 | A1 | 10/2006 | Shibayama et al. | |
| 2007/0229974 | A1 | 10/2007 | Shibayama et al. | |
| 2007/0297067 | A1 | 12/2007 | Muramatsu et al. | |

(Continued)

FOREIGN PATENT DOCUMENTS

JP        H06-034885 A    2/1994

(Continued)

*Primary Examiner* — Darryl J Collins
(74) *Attorney, Agent, or Firm* — Pearne & Gordon LLP

(57) ABSTRACT

Provided is a zoom lens system including a compact focusing lens unit and having a suppressed change in image magnification at the time of movement of the focusing lens unit. The zoom lens system of the present invention, in order from an object side to an image side, includes a first lens unit G1 having positive optical power, a second lens unit G2 having negative optical power, a third lens unit G3 having negative optical power, and a fourth lens unit G4 having positive optical power. At the time of zooming, all lens units moves in a direction along the optical axis such that intervals among respective lens units varies. Further, at the time of zooming, the third lens unit G3 moves in the direction along the optical axis such that the interval between the second lens unit G2 and the third lens unit G3 is made longer at a telephoto limit than the interval at a wide-angle limit. Still further, condition (6): $-1.6 < f_F/f_{4\alpha} < -0.7$ is satisfied (where, $f_F$ is a focal length of a focusing lens unit, and $f_{4\alpha}$ is a composite focal length of the fourth lens unit G4 and a lens unit subsequent thereto at a wide-angle limit).

14 Claims, 16 Drawing Sheets

U.S. PATENT DOCUMENTS

2008/0055461 A1 3/2008 Ito
2008/0056699 A1 3/2008 Ito

FOREIGN PATENT DOCUMENTS

| | | | |
|---|---|---|---|
| JP | H08-220438 A | 8/1996 | |
| JP | H09-230239 A | 9/1997 | |
| JP | H10-048518 A | 2/1998 | |
| JP | H11-044848 A | 2/1999 | |
| JP | H11-064732 A | 3/1999 | |
| JP | H11-109240 A | 4/1999 | |
| JP | H11-160621 A | 6/1999 | |
| JP | H11-305128 A | 11/1999 | |
| JP | 2000-111789 A | 4/2000 | |
| JP | 2000-121942 A | 4/2000 | |
| JP | 2000-333064 A | 11/2000 | |
| JP | 2003-287680 A | 10/2003 | |
| JP | 2005-284097 A | 10/2005 | |
| JP | 2005-316396 A | 11/2005 | |
| JP | 2005-352057 A | 12/2005 | |
| JP | 2006-221092 A | 8/2006 | |
| JP | 2006-267425 A | 10/2006 | |
| JP | 2007-219315 A | 8/2007 | |
| JP | 2008-3195 A | 1/2008 | |
| JP | 2008-015251 A | 1/2008 | |

* cited by examiner

ZOOM LENS SYSTEM, INTERCHANGEABLE LENS APPARATUS AND CAMERA SYSTEM

CROSS-REFERENCE TO RELATED APPLICATION

This application is based on Japanese Patent Application No. 2009-020095 filed on Jan. 30, 2009. Hereby, the contents of Japanese Patent Application No. 2009-020095 are incorporated by reference.

BACKGROUND OF THE INVENTION

1. Field of the Invention

The present invention relates to a zoom lens system and, in particular, to a zoom lens system suitable for an imaging lens system employed in an interchangeable lens apparatus in a so-called interchangeable-lens type digital camera system. Further, the present invention relates to an interchangeable lens apparatus and a camera system that employ this zoom lens system.

2. Description of the Background Art

In recent years, interchangeable-lens type digital cameras are rapidly spreading. The interchangeable-lens type digital camera is a camera system including: a camera body employing an image sensor composed of a CCD (Charge Coupled Device), a CMOS (Complementary Metal-Oxide Semiconductor), or the like; and an interchangeable lens apparatus employing an imaging lens system for forming an optical image on the light acceptance surface of the image sensor. Zoom lens systems applicable to the above interchangeable-lens type digital camera are disclosed in Japanese Laid-Open Patent Publication No. 2005-284097, Japanese Laid-Open Patent Publication No. 2005-352057, Japanese Laid-Open Patent Publication No. 2006-221092, Japanese Laid-Open Patent Publication No. 2005-316396, Japanese Laid-Open Patent Publication No. 2006-267425, Japanese Laid-Open Patent Publication No. 2007-219315, Japanese Laid-Open Patent Publication No. 2008-3195, and Japanese Laid-Open Patent Publication No. 2008-15251.

On the other hand, there are interchangeable-lens type digital cameras employing a function of displaying image data generated by the imaging lens system or the image sensor on a display unit such as a liquid crystal display or the like of a camera body (hereinafter referred to as "live view function") (e.g., Japanese Laid-Open Patent Publication No. 2000-111789 and Japanese Laid-Open Patent Publication No. 2000-333064).

SUMMARY OF THE INVENTION

In the interchangeable-lens type digital cameras disclosed in Japanese Laid-Open Patent Publication No. 2000-111789 and Japanese Laid-Open Patent Publication No. 2000-333064, when the live view function is being performed, a contrast AF method is employed to perform focusing operation. The contrast AF is the focusing operation based on the contrast value of image data obtained from the image sensor. Hereinafter, an operation of the contrast AF will be described.

First, the interchangeable-lens type digital camera oscillates the focusing lens unit in the optical axis direction at a high-speed (hereinafter referred to as "wobbling") thereby to detect the direction of displacement from an in-focus condition. After the wobbling, the interchangeable-lens type digital camera detects, from an output signal of the image sensor, signal components in a predetermined frequency band in an image region and calculates an optimal position of the focusing lens unit for realizing the in-focus condition. Thereafter, the interchangeable-lens type digital camera moves the focusing lens unit to the optimal position, and completes the focusing operation. When the focusing operation is performed continuously in video image taking or the like, the interchangeable-lens type digital camera repeats a series of the above operations.

Generally, in order that uneasiness such as flickers should be avoided, video displaying need be performed at a high rate of, for example, 30 frames per second. Thus, basically, video image taking using the interchangeable-lens type digital camera also need be performed at the same rate of 30 frames per second. Accordingly, the focusing lens unit need be driven at the high rate of 30 Hz at the time of wobbling.

However, if the weight of the focusing lens unit is large, a larger motor or actuator is required to move the focusing lens unit at a high rate. This causes a problem that the outer diameter of the lens barrel is increased. However, in the case of the zoom lens systems for the interchangeable-lens type digital camera disclosed in the above conventional arts, the focusing lens unit is hardly light-weighted.

Further, in the interchangeable-lens type digital camera, it should be noted that the size of the image corresponding to a photographic object varies in association with wobbling. This variation in the image is caused mainly by the fact that the movement of the focusing lens unit in the optical axis direction generates a change in the focal length of the entire lens system. Then, when a large change in the image taking magnification is generated in association with wobbling, the image taking person will feel uneasiness.

An object of the present invention is to provide a zoom lens system which includes a compactly constructed focusing lens unit and which has a suppressed change in the image magnification at the time of movement of the focusing lens unit, and an interchangeable lens apparatus and a camera system which employ this zoom lens system.

A zoom lens system according to the present invention, in order from an object side to an image side, includes: a first lens unit having positive optical power; a second lens unit having negative optical power; a third lens unit having negative optical power; and a fourth lens unit having positive optical power. At the time of zooming, all lens units moves in a direction along the optical axis such that intervals among respective lens units varies. Further, at the time of zooming, the third lens unit moves in the direction along the optical axis such that the interval between the second lens unit and the third lens unit is made longer at a telephoto limit than the interval at a wide-angle limit. Still further, the following condition is satisfied.

$$-1.6 < f_F/f_{4\alpha} < -0.7 \qquad (6)$$

where, $f_F$ is a focal length of a focusing lens unit, and
$f_{4\alpha}$ is a composite focal length of the fourth lens unit and a lens unit subsequent thereto at a wide-angle limit.

Further, an interchangeable lens apparatus according to the present invention includes: any of the above zoom lens systems; and a mount section detachably connected to a camera body that includes an image sensor which receives an optical image formed by the zoom lens system thereby to convert the optical image to an electrical image signal.

Moreover, a camera system according to the present invention includes: an interchangeable lens apparatus including any of the above zoom lens systems; and a camera body which is connected to the interchangeable lens apparatus via a camera mount section in an attachable and removable manner and includes an image sensor which receives an optical image formed by the zoom lens system thereby to convert the optical image to an electrical image signal.

According to the present invention, it is possible to provide a zoom lens system which includes a compactly constructed focusing lens unit and which has a suppressed change in image magnification at the time of movement of the focusing lens unit, and an interchangeable lens apparatus and a camera system which employ the zoom lens system.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
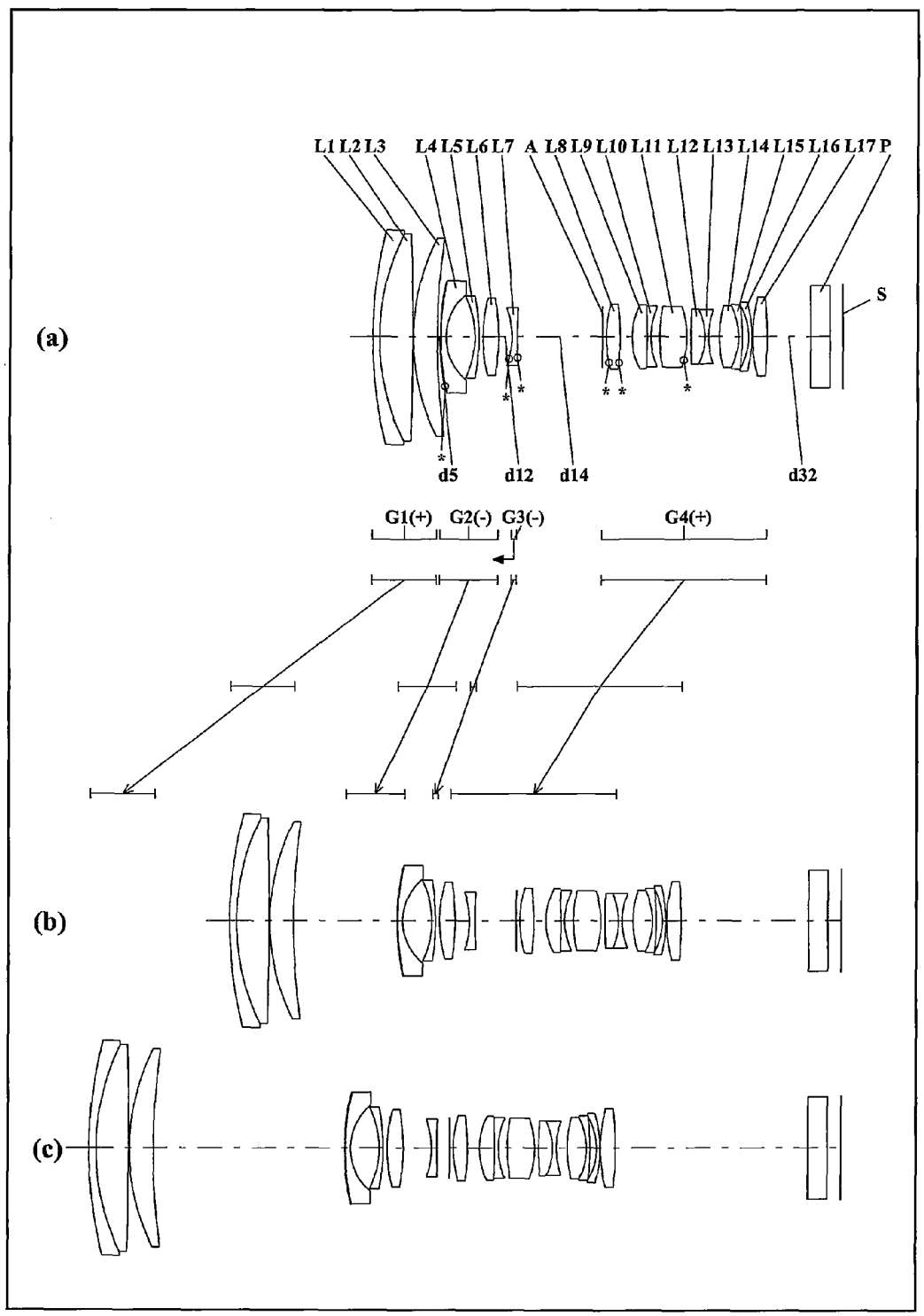
FIG. 1 is a lens arrangement diagram showing an infinity in-focus condition of a zoom lens system according to Embodiment 1 (Example 1)
Figure 2:
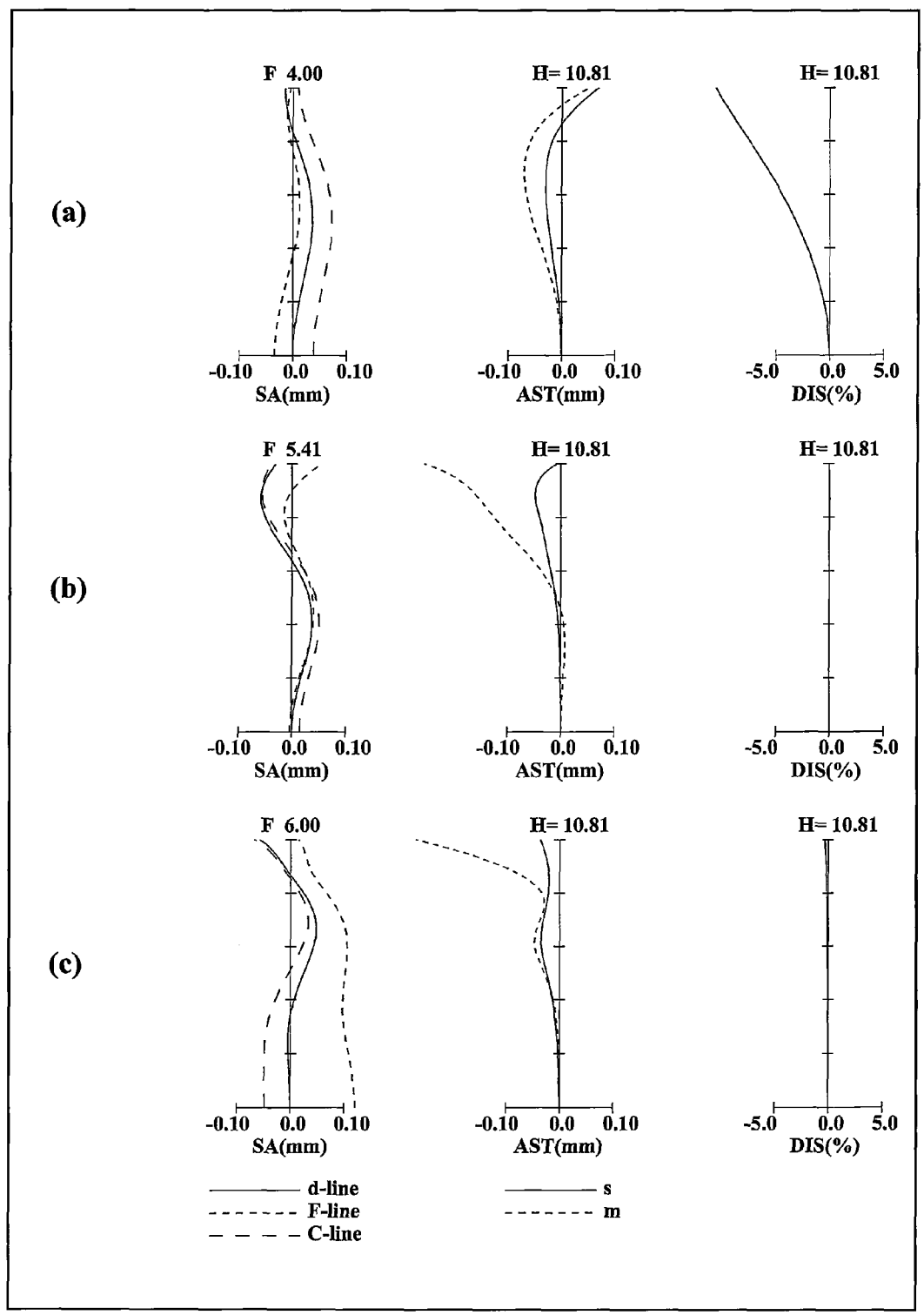
FIG. 2 is a longitudinal aberration diagram showing an infinity in-focus condition of a zoom lens system according to Example 1.
Figure 3:
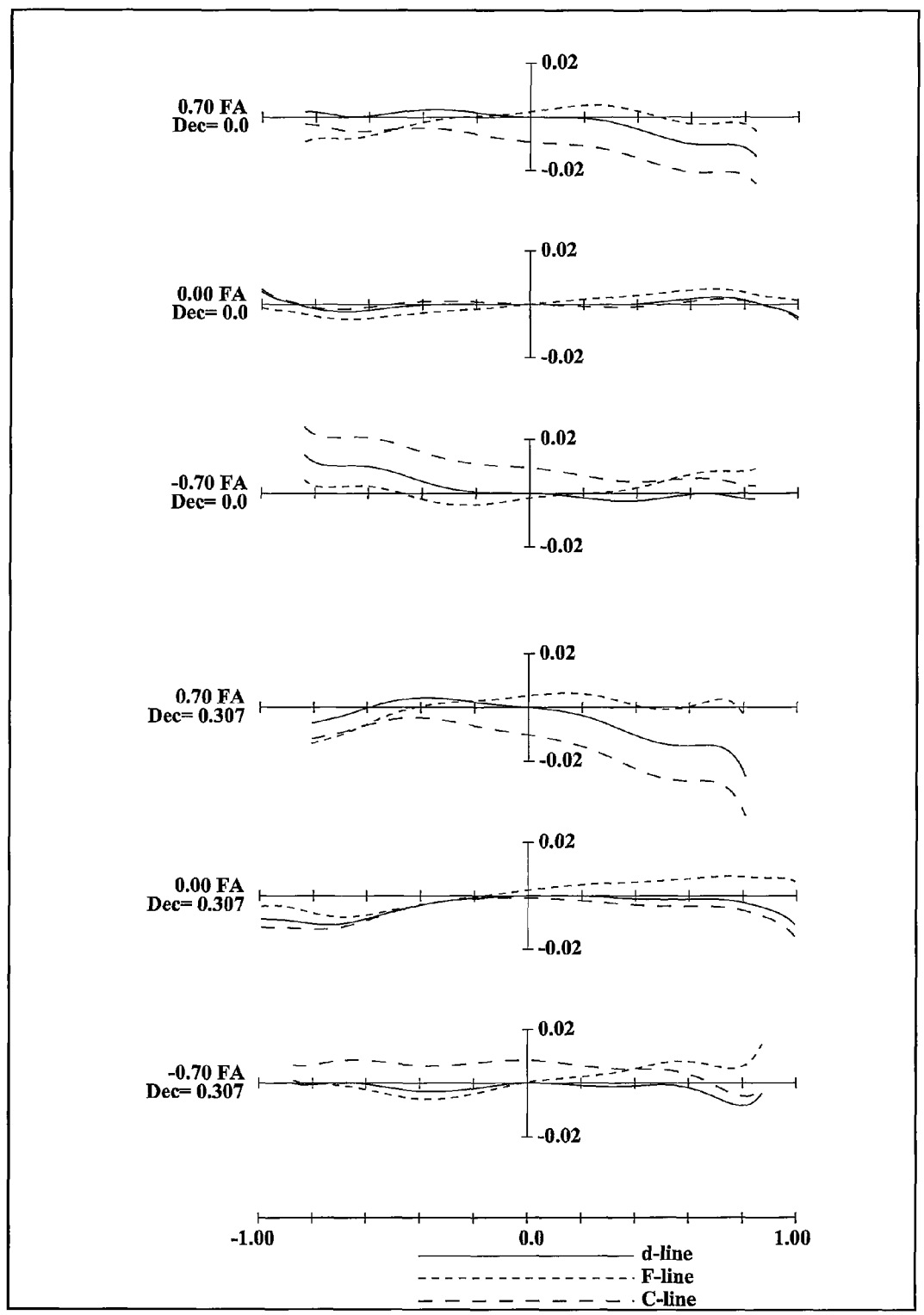
FIG. 3 is a lateral aberration diagram in a basic state where image blur compensation is not performed and in an image blur compensation state at a telephoto limit of a zoom lens system according to Example 1.

FIGS. 1, 4, 7, 10, and 13 show lens arrangement diagrams of zoom lens systems according to Embodiments 1, 2, 3, 4, and 5, respectively, and each show a zoom lens system in a infinity in-focus condition.

In each diagram, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each diagram, each bend arrow located between part (a) and part (b) indicates a line obtained by connecting the positions of the lens units respectively at a wide-angle limit, a middle position, and a telephoto limit, in order from the top. In the part between the wide-angle limit and the middle position, and the part between the middle position and the telephoto limit, the positions are connected simply with a straight line, and hence this line does not indicate actual motion of each lens unit. Moreover, in each diagram, an arrow imparted to a lens unit indicates focusing from an infinity in-focus condition to a close-object in-focus condition. That is, the arrow indicates the moving direction at the time of focusing from an infinity in-focus condition to a close-object in-focus condition.

In FIGS. 1, 4, 7, 10, and 13, an asterisk "*" imparted to a particular surface indicates that the surface is aspheric. Further, in each diagram, symbol (+) or symbol (−) imparted to the symbol of each lens unit corresponds to the sign of the optical power of the lens unit. Still further, in each diagram, the straight line located on the most right-hand side indicates the position of the image surface S. On the object side relative to the image surface S (between the image surface S and a surface of a lens closest to the image side in the fourth lens unit G4), there is arranged a parallel plate P which corresponds to an optical low-pass filter, a face plate of an image sensor, or the like. Further, in each diagram, an aperture diaphragm A is arranged on the object side relative to the fourth lens unit G4 while an interval which does not change at the time of zooming is arranged therebetween.

The zoom lens system according to each of Embodiments 1 to 5, in order from the object side to the image side, includes a first lens unit G1 having positive optical power, a second lens unit G2 having negative optical power, a third lens unit G3 having negative optical power, and a fourth lens unit G4 having positive optical power.

(Embodiments 1 to 4)

The first lens unit G1, in order from the object side to the image side, includes: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, includes: a negative meniscus fourth lens element L4 with the convex surface facing the object side; a negative meniscus fifth lens element L5 with the convex surface facing the image side; and a bi-convex sixth lens element L6. The fourth lens element L4 is a hybrid lens obtained by cementing a transparent resin layer formed of a UV cured resin onto a surface of the lens element facing the object side. The hybrid lens has an aspheric surface formed of a transparent resin layer. Accordingly, it is possible to form a large diameter aspheric surface which is difficult to obtain by only press-molding of glass. Further, as compared to the case where the lens element is formed of a resin only, the hybrid lens is stable against temperature variation in terms of both refractive-index variation and shape variation, and thus it is possible to provide a lens element having a high refractive index.

The third lens unit G3 includes: a bi-concave seventh lens element L7. Both surfaces of the seventh lens element L7 are aspheric.

The fourth lens unit G4, in order from the object side to the image side; includes: a bi-convex eighth lens element L8; a bi-convex ninth lens element L9; a bi-concave tenth lens element L10; a bi-convex eleventh lens element L11, a bi-convex twelfth lens element L12; a bi-concave thirteenth lens element L13; a bi-convex fourteenth lens element L14; a negative meniscus fifteenth lens element L15 with the convex surface facing the image side; a negative meniscus sixteenth lens element L16 with the convex surface facing the image side; and a bi-convex seventeenth lens element L17. The ninth lens element L9 and the tenth lens element L10 are cemented with each other. The twelfth lens element L12 and the thirteenth lens element L13 are cemented with each other. Moreover, the fourteenth lens element L14 and the fifteenth lens element L15 are cemented with each other. Further, both surfaces of the eighth lens element L8 and a surface of the eleventh lens element L11 facing the image side are aspheric.

(Embodiment 5)

The first lens unit G1, in order from the object side to the image side, includes: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, includes: a negative meniscus fourth lens element L4 with the convex surface facing the object side; a negative meniscus fifth lens element L5 with the convex surface facing the image side; and a bi-convex sixth lens element L6. A surface of the fourth lens element L4 facing the object side is aspheric.

The third lens unit G3 includes: a bi-concave seventh lens element L7. Both surfaces of the seventh lens element L7 are aspheric.

The fourth lens unit G4, in order from the object side to the image side; includes: a bi-convex eighth lens element L8; a bi-convex ninth lens element L9; a bi-concave tenth lens element L10; a bi-convex eleventh lens element L11, a bi-convex twelfth lens element L12; a bi-concave thirteenth lens element L13; a bi-convex fourteenth lens element L14; a negative meniscus fifteenth lens element L15 with the convex surface facing the image side; a negative meniscus sixteenth lens element L16 with the convex surface facing the image side; and a bi-convex seventeenth lens element L17. The ninth lens element L9 and the tenth lens element L10 are cemented with each other. The twelfth lens element L12 and the thirteenth lens element L13 are cemented with each other. Moreover, the fourteenth lens element L14 and the fifteenth lens element L15 are cemented with each other. Further, both surfaces of the eighth lens element L8 and a surface of the eleventh lens element L11 facing the image side are aspheric.

The zoom lens system according to each of the embodiments changes intervals among respective lens units at the time of zooming such that: the interval between the first lens unit G1 and the second lens unit G2 is made longer at a telephoto limit than the interval at a wide-angle limit; the interval between the second lens unit G2 and the third lens unit G3 is made longer at a telephoto limit than the interval at a wide-angle limit; and the interval between the third lens unit G3 and the fourth lens unit G4 is made longer at a telephoto limit than the interval at a wide-angle limit.

More specifically, in Embodiments 1 to 3 and 5, at the time of zooming from a wide-angle limit to a telephoto limit, the individual lens units move in a direction along the optical axis monotonously to the object side such that: the interval between the first lens unit G1 and the second lens unit G2, and the interval between the second lens unit G2 and the third lens unit G3 are increased, respectively; whereas the interval between the third lens unit G3 and the fourth lens unit G4 is decreased. In Embodiment 4, at the time of zooming from a wide-angle limit to a telephoto limit, the individual lens units move along the optical axis monotonously to the object side such that: the interval between the first lens unit G1 and the second lens unit G2 is increased; the interval between the second lens unit G2 and the third lens unit G3 is decreased and then increased; and the interval between the third lens unit G3 and the fourth lens unit G4 is decreased. It is noted that in any of the embodiments, the aperture diaphragm A moves to the object side together with the fourth lens unit G4.

Further, at the time of focusing from an infinity in-focus condition to a close-point in-focus condition, the third lens unit G3 moves to the object side along the optical axis.

To allow video taking, the focusing lens unit need have high-speed response while wobbling operation. In the zoom lens system according to each of the above Embodiments 1 to 6, the third lens unit G3 is composed of one lens element, whereby a focusing lens unit having a reduced weight and high-speed response is realized. It is noted that the focusing lens unit need not necessarily be formed of one lens element. If the torque performance of the actuator allows, the focusing lens unit may includes two lens elements. Further, in order to minimize fluctuation in performance in focusing from infinity to a close-point distance, the focusing lens unit has an aspheric surface. The aspheric surface may be a hybrid aspheric surface.

In the zoom lens system according to Embodiments 1 to 5, the fourth lens unit G4 is arranged closest to the object side, and includes: a first sub lens unit having positive optical power; a second sub lens unit having negative optical power and arranged on the image side relative to the first sub lens unit; and a third sub lens unit having positive optical power and arranged closest to the image side. It is noted that the sub lens unit represents, when one lens unit includes a plurality of lens elements, any one of lens elements or a combination of adjoining lens elements included in the lens unit.

More specifically, in Embodiments 1 to 5, in the fourth lens unit G4, the eighth lens element L8, the ninth lens element L9, the tenth lens element L10, and the eleventh lens element L11 form a first sub lens unit, and the twelfth lens element L12 and the thirteenth lens element L13 form a second sub lens unit. Further, the fourteenth lens element L14, the fifteenth lens element L15, the sixteenth lens element L16, and the seventeenth lens element L17 form a third sub lens unit.

At the time of image blur compensation for compensating image blur caused by vibration applied to the zoom lens, the second sub lens unit moves in a direction perpendicular to the optical axis.

To obtain an sufficient optical image blur compensation effect, the sub lens unit moving in a direction perpendicular to the optical axis need have high-speed response. In above Embodiments 1 to 5, the second sub lens unit for compensating the movement of an image point is formed of two lens elements, whereby the sub lens unit having a reduced weight and high-speed response is realized. When the sub lens unit for image blur compensation is formed of two lens elements, it is possible to suppress, to an allowable range, field curvature aberration or chromatic aberration which is generated at the time of image blur compensation at the image height in a diagonal direction on the image surface, and consequently it is possible to obtain desired imaging characteristics. It is noted, however, that the configuration of the sub lens unit for image blur compensation varies depending on the characteristics required for the zoom lens system. When the allowable range of the field curvature aberration or chromatic aberration is broad, the sub lens unit for image blur compensation may be formed of one lens element.

The following description is given for conditions to be satisfied by the zoom lens system according to each embodiment. Here, in the zoom lens system according to each embodiment, a plurality of conditions to be satisfied are set forth. Thus, a configuration of the zoom lens system that satisfies as many applicable conditions as possible is most preferable. However, when an individual condition is satisfied, a zoom lens system having a corresponding effect can be obtained.

In the zoom lens system according to each embodiment, it is preferable that the following condition is satisfied.

$$0.6 < f_{4A}/f_{4\alpha} < 1.0 \quad (1)$$

where, $f_{4A}$ is a focal length of the first sub lens unit in the case where the fourth lens unit includes the first sub lens unit having positive optical power and the second sub lens unit arranged on the image side relative to the first sub lens unit and having negative optical power, and $f_{4\alpha}$ is a composite focal length of the fourth lens unit and a lens unit subsequent thereto at a wide-angle limit.

The condition (1) sets forth the ratio between the focal length of the first sub lens unit included in the fourth lens unit and the composite focal length of the fourth lens unit and a lens unit subsequent thereto. When the value exceeds the upper limit of the condition (1), the field curvature at a wide-angle limit becomes excessive toward the under side. Thus, this situation is unpreferable. On the other hand, when the value goes below the lower limit of the condition (1), the back focus is elongated, and thus the overall length cannot be compact.

In the zoom lens system according to each embodiment, it is preferable that the following condition is satisfied.

$$0.6 < f_{4Ob}/f_{4\alpha} < 1.0 \quad (2)$$

where, when the fourth lens unit, in order from the object side to the image side, includes: a lens element having positive optical power; a lens element having positive optical power; a lens element having negative optical power; and a lens element having positive optical power, $f_{4Ob}$ is a composite focal length of the four lens elements, and $f_{4\alpha}$ is a composite focal length of the fourth lens unit and a lens unit subsequent thereto at a wide-angle limit.

The condition (2) sets forth the ratio between the composite focal length of four lens elements arranged closest to the object side in the fourth lens unit and the composite focal length of the fourth lens unit and a lens unit subsequent thereto. When the value exceeds the upper limit of the condition (2), the field curvature at a wide-angle limit becomes excessive toward the under side. When the value goes below the lower limit of the condition (2), the back focus is elongated, and the overall length cannot be compact.

In the zoom lens system according to each embodiment, it is preferable that the following condition is satisfied.

$$-1.5 < f_{4B}/f_{4\alpha} < -0.9 \quad (3)$$

where, $f_{4B}$ is a focal length of the second sub lens unit in the case where the fourth lens unit includes the first sub lens unit having positive optical power, and the second sub lens unit arranged on the image side relative to the first sub lens unit and having negative optical power, and $f_{4\alpha}$ is a composite focal length of the fourth lens unit and a lens unit subsequent thereto at a wide-angle limit.

The condition (3) sets forth the ratio between the focal length of the second sub lens unit included in the fourth lens unit and the composite focal length of the fourth lens unit and a lens unit subsequent thereto. In the case where the second sub lens unit is moved in a direction perpendicular to the optical axis for the purpose of image blur compensation, when the value exceeds the upper limit of the condition (3), the amount of blur compensation increases, which leads to upsizing of a blur compensation mechanism. Thus, this situation is unpreferable. In contrast, when the value goes below the lower limit of the condition (3), sensitivity at the time of blur compensation increases, and it becomes difficult to maintain accuracy of the position control required for blur compensation. Thus, this situation is unpreferable.

In the zoom lens system according to each embodiment, it is preferable that the following condition is satisfied.

$$3.0 < f_{4Im}/f_{4\alpha} < 4.5 \quad (4)$$

where, when the fourth lens unit, in order from the image side to the object side, includes; a lens element having positive optical power; a lens element having negative optical power; a lens element having negative optical power; and a lens element having positive optical power, $f_{4Im}$ is a composite focal length of the four lens elements; and $f_{4\alpha}$ is a composite focal length of the fourth lens unit and a lens unit subsequent thereto at a wide-angle limit.

The condition (4) sets forth the ratio between the composite focal length of four lens elements arranged closest to the object side in the fourth lens unit and the composite focal length of the fourth lens unit and a lens unit subsequent thereto. When the value exceeds the upper limit of the condition (4), the distortion at a wide-angle limit becomes excessive toward the over side. Thus, this situation is unpreferable. Further, the value goes below the lower limit of the condition (4), the back focus is elongated, and the overall length cannot be compact.

In the zoom lens system according to each embodiment, it is preferable that the following condition is satisfied.

$$1.0 < f_{4\alpha}/f_W < 1.5 \quad (5)$$

where, $f_{4\alpha}$ is a composite focal length of the fourth lens unit and a lens unit subsequent thereto at a wide-angle limit, and $f_W$ is a focal length of the entire system at a wide-angle limit.

The condition (5) sets forth the focal length of the fourth lens unit and a lens unit subsequent thereto. When the value exceeds the upper limit of the condition (5), the incident angle relative to the image surface is increased, and it becomes difficult to secure the telecentricity. Further, when the value goes below the lower limit of the condition (5), it is not desirable since the flange back cannot be obtained.

In the zoom lens system according to each embodiment, it is preferable that the following condition is satisfied.

$$-1.6 < f_F/f_{4\alpha} < -0.7 \quad (6)$$

where, $f_F$ is a focal length of the focusing lens unit, and $f_{4\alpha}$ is a composite focal length of the fourth lens unit and a lens unit subsequent thereto at a wide-angle limit.

The condition (6) sets forth the ratio between the focal length of the focusing lens unit and the composite focal length of the fourth lens unit and a lens unit subsequent thereto. When the value exceeds the upper limit of the condition (6), the fluctuation in the field curvature at the time of focusing increases. Thus, this situation is unpreferable. Further, when the value goes below the lower limit of the condition (6), it may cause upsizing of the optical system when the amount of movement in association with focusing is large. Thus, this situation is unpreferable.

In the zoom lens system according to each embodiment, it is preferable that the following condition is satisfied.

$$12 < f_1 \ast (f_T/f_W)/\sqrt{(f_W \ast f_T)} < 27 \quad (7)$$

where, $f_1$ is a focal length of the first lens unit, $f_T$ is a focal length of the entire system at a telephoto limit, and $f_W$ is a focal length of the entire system at a wide-angle limit.

The condition (7) sets forth the relation between the focal length of the first lens unit and the focal length of the entire system. When the value exceeds the upper limit of the condition (7), it causes an increase in the amount of movement of the first unit from a wide-angle limit to a telephoto limit, and as a result, an intersection angle (pressure angle) of the cam become acute, resulting in fluctuation in load of the cam. Thus, this situation is unpreferable. Further, when the value goes below the lower limit of the condition (7), it becomes difficult to compensate the magnification chromatic aberration generated in the first lens unit by using the subsequent lens units. Thus, this situation is unpreferable.

In the zoom lens system according to each embodiment, it is preferable that the following condition is satisfied.

$$-20 < f_2 \ast (f_T/f_W)/\sqrt{(f_W \ast f_T)} < -6 \quad (8)$$

where, $f_2$ is a focal length of the second lens unit, $f_T$ is a focal length of the entire system at a telephoto limit, and $f_W$ is a focal length of the entire system at a wide-angle limit.

The condition (8) sets forth the relation between the focal length of the second lens unit and the focal length of the entire system. When the value exceeds the upper limit of the condition (8), the negative optical power of the second lens unit is excessively increased, and the field curvature is apt to be toward the under side, and as a result, the difference in the peripheral image surface increases between the wide-angle limit and the telephoto limit at the time of variation of magnification. Thus, the situation is not preferable. Further, when the value goes below the lower limit of the condition (8), the negative optical power of the second lens unit is excessively decreased, and the field curvature is apt to be toward the over side, and as a result, the difference in the peripheral image surface increases between the wide-angle limit and the telephoto limit at the time of variation of magnification. Thus, this situation is not preferable.

In the zoom lens system according to each embodiment, it is preferable that the following condition is satisfied.

$$0.5 < \delta t_1/f_1 < 1.1 \quad (9)$$

where, $\delta t_1$ is an amount of movement of the first lens unit from a wide-angle limit to a telephoto limit (where, the position of the wide-angle limit is set as the reference, and expansion to the object side from the reference position is regarded as a positive value), and $f_1$ is a focal length of the first lens unit.

The condition (9) sets forth the amount of movement of the first lens unit in the optical axis direction. When the value exceeds the upper limit of the condition (9), with a moving mechanism of the first lens unit being configured with a cam, it is difficult to smoothly form the curve of the cam groove. When the value of the condition (9) goes below the lower limit, the overall length is elongated at a wide-angle limit, or the overall length is shortened at a telephoto limit. When the overall length is elongated at a wide-angle limit, a front lens diameter increases. Thus, this is unpreferable. On the other hand, when the overall length is shortened at a telephoto limit, the sensitivity of the first lens unit increases. This situation is unpreferable from the viewpoint of manufacturing.

In the zoom lens system according to each embodiment, it is preferable that the following condition is satisfied.

$$-0.7 < \delta t_2/f_2 < -0.2 \quad (10)$$

where, $\delta t_2$ is an amount of movement of the second lens unit from a wide-angle limit to a telephoto limit (where, the position of the wide-angle limit is set as the reference, and expansion to the object side from the reference position is regarded as a positive value), and $f_2$ is a focal length of the second lens unit.

The condition (10) sets forth the amount of movement of the second lens unit in the optical axis direction. When the value exceeds the upper limit of the condition (10), the position of the incident pupil moves considerably deeply to the image surface side, which causes increase in the front lens diameter. Thus, this situation is unpreferable. Further, when the value goes below the lower limit of the condition (10), the power of the second lens unit increases, and this causes difficulty in compensating aberration. If the aberration compensation is to be performed, the number of lenses will be increased. Thus, this situation is unpreferable.

In the zoom lens system according to each embodiment, it is preferable that the following condition is satisfied.

$$-1.2 < \delta t_3/f_3 < -0.4 \quad (11)$$

where, $\delta t_3$ is an amount of movement of the third lens unit from a wide-angle limit to a telephoto limit (where, the position of the wide-angle limit is set as the reference, and expansion to the object side from the reference position is regarded as a positive value), and $f_3$ is a focal length of the third lens unit.

The condition (11) sets forth the amount of movement of the third lens unit in the optical axis direction. When the value exceeds the upper limit of the condition (11), upsizing of the actuator for focusing will be caused. Thus, this situation is unpreferable. Further, when the value goes below the lower limit of the condition (11), the power of the third lens unit increases, and sensitivity for decentering increases. Thus, this situation is unpreferable.

In the zoom lens system according to each embodiment, it is preferable that the following condition is satisfied.

$$1.2 < \delta t_4/f_4 < 2.0 \qquad (12)$$

where, $\delta t_4$ is an amount of movement of the fourth lens unit from a wide-angle limit to a telephoto limit (where, the position of the wide-angle limit is set as the reference, and expansion to the object side from the reference position is regarded as a positive value), and $f_4$ is a focal length of the fourth lens unit.

The condition (12) sets forth the amount of movement of the fourth lens unit in the optical axis direction. When the value exceeds the upper limit of the condition (12), the overall length of the entire system is elongated at a telephoto limit, and thus the amount of movement of the first lens unit from a wide-angle limit to a telephoto limit increases. When a moving mechanism of the first lens unit is configured with a cam, the intersection angle (pressure angle) of the cam becomes acute, resulting in fluctuation in load of the cam. Thus, this situation is unpreferable. Further, when the value goes below the lower limit of the condition (12), the power of the second lens unit increases, and fluctuation in the field curvature increases from a wide-angle limit to a telephoto limit, which cause difficulty in its compensation. Thus, this situation is unpreferable.

In the zoom lens system according to each embodiment, it is preferable that the following condition is satisfied.

$$-25 < \beta_{2T}/\beta_{2W} < 34 \qquad (13)$$

where, $\beta_{2T}$ is paraxial imaging magnification of the second lens unit at a telephoto limit, and $\beta_{2W}$ is paraxial imaging magnification of the second lens unit at a wide-angle limit.

The condition (13) sets forth the change in magnification of the second lens unit. When the value exceeds the upper limit of the condition (13), it becomes difficult to compensate aberration from a wide-angle limit to a telephoto limit. Thus, this situation is unpreferable. Further, when the value goes below the lower limit of the condition (13), the amount of movement of the second lens unit from a wide-angle limit to a telephoto limit increases, and consequently, the overall length of the entire system is elongated. Thus, this situation is unpreferable.

In the zoom lens system according to each embodiment, it is preferable that the following condition is satisfied.

$$-8 < \beta_{3T}/\beta_{3W} < 0.2 \qquad (14)$$

where, $\beta_{3T}$ is paraxial imaging magnification of the third lens unit at a telephoto limit, and $\beta_{3W}$ is paraxial imaging magnification of the third lens unit at a wide-angle limit.

The condition (14) sets forth the change in magnification of the third lens unit. When the value exceeds the upper limit of the condition (14), the power of the third lens unit is increased, and fluctuation of an image at the time of focusing increases. Thus, this situation is unpreferable. Further, when the value goes below the lower limit of the condition (14), the power of the third lens unit is decreased, the amount of movement of the third lens unit at the time of focusing increases. Thus, this situation is unpreferable.

In the zoom lens system according to each embodiment, it is preferable that the following condition is satisfied.

$$2 < \beta_{4T}/\beta_{4W} < 3.2 \qquad (15)$$

where, $\beta_{4T}$ is paraxial imaging magnification of the fourth lens unit at a telephoto limit, and $\beta_{4W}$ is paraxial imaging magnification of the fourth lens unit at a wide-angle limit.

The condition (15) sets forth the change in magnification of the fourth lens unit. When the value exceeds the upper limit of the condition (15), the incident angle of light to be incident on the image surface at a wide-angle limit increases, and it becomes difficult to maintain the telecentricity. Thus, this situation is unpreferable. Further, when the value goes below the lower limit of the condition (15), the back focus is elongated at a wide-angle limit, and the entire system cannot be compact. Thus, this situation is unpreferable.

If the focusing lens unit included in the zoom lens system according to each embodiment has an aspheric surface, it is preferable that the following condition is satisfied.

$$-0.3 < f_F * \beta_{FW} * \beta_{FW}/(\delta s_F * f_T/f_W) < 7.0 \qquad (16)$$

where, $f_F$ is a focal length of the focusing lens unit, $\beta_{FW}$ is paraxial imaging magnification of the focusing lens unit at a wide-angle limit, $\delta s_F$ is an amount of deformation of an aspheric surface at a height of $0.5*f_W*\tan \omega_W$ from the optical axis, the aspheric surface being arranged closest to the object side in the focusing lens unit, $f_T$ is a focal length of the entire system at a telephoto limit, $f_W$ is a focal length of the entire system at a wide-angle limit, and $\omega_W$ is a half view angle at a wide-angle limit.

The condition (16) sets forth the relation between the paraxial imaging magnification and the amount of aspheric aberration of the focusing lens unit. When the value exceeds the upper limit of the condition (16), the astigmatism and spherical aberration from an infinity distance at a telephoto limit to a close-point distance are increased to the under side, and thus this situation is unpreferable from the viewpoint of the aberration compensation. When the value goes below the lower limit of the condition (16), the aberration sensitivity relative to process errors increases, and thus fluctuation in the field curvature caused by manufacturing variation increases. Thus, this situation is unpreferable.

In the zoom lens system according to each embodiment, it is preferable that the following condition is satisfied.

$$-1.7 < DIS_W * f_T/f_W < -0.5 \qquad (17)$$

where, $DIS_W$ is an amount of distortion of the maximum image height at a wide-angle limit, $f_T$ is a focal length of the entire system at a telephoto limit, and $f_W$ is a focal length of the entire system at a wide-angle limit.

The condition (17) sets forth the relation between the amount of distortion and a variable magnification ratio. In the case where the camera system is provided with a distortion compensation system, when the value exceeds the upper limit of the condition (17), the advantage of shortening of the overall length by the above system cannot be utilized. Thus, this situation is unpreferable. In contrast, when the value goes below the lower limit of the condition (17), the image magnification rate is increased in the distortion compensation process, resulting in degradation in resolution. Thus, this situation is unpreferable.

In the zoom lens system according to each embodiment, it is preferable that the following condition is satisfied.

$$1.88 < nd_2 \quad (18)$$

where, $nd_2$ is an average refractive index of a lens element (a portion excluding a resin layer in the case of a hybrid lens) included in the second lens unit.

When the value goes below the lower limit of the condition (18), the distortion mainly at a wide-angle limit increases due to decrease in the curvature of the lens, which causes difficulty in compensating the aberration. Thus, this situation is unpreferable.

Here, the individual lens units included in the zoom lens system according to each embodiment may be composed exclusively of refractive type lens elements that deflect incident light by refraction (that is, lens elements of a type in which deflection is achieved at the interface between media each having a distinct refractive index). Alternatively, the lens may be composed of any one of, or a combination of some of: diffractive type lens elements that deflect the incident light by diffraction; refractive-diffractive hybrid type lens elements that deflect the incident light by a combination of diffraction and refraction; refractive index distribution type lens elements that deflect the incident light by distribution of refractive index in the medium, and the like.

(Embodiment 6)

Figure 16:
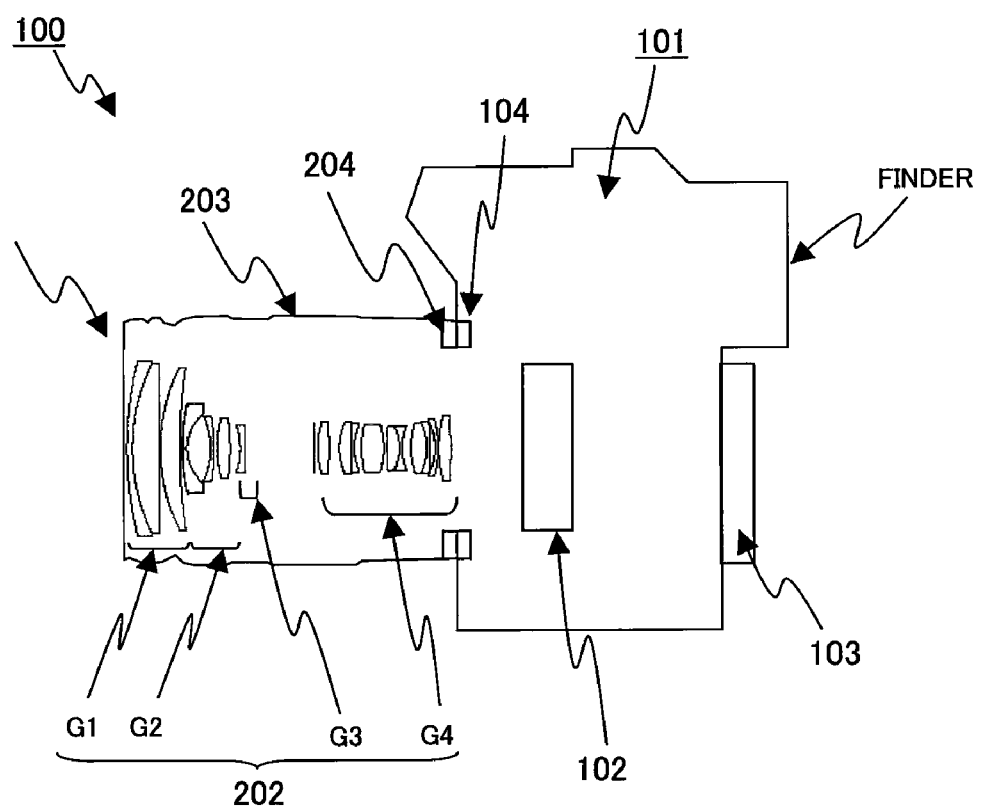
FIG. 16 is a schematic construction diagram of a camera system according to Embodiment 6.

FIG. 16 is a schematic construction diagram of a camera system according to Embodiment 6.

A camera system 100 according to the present embodiment includes a camera body 101, and an interchangeable lens apparatus 201 connected to the camera body 101 in an attachable and removable manner.

The camera body 101 includes an image sensor 102 which receives an optical image formed by a zoom lens system 202 of the interchangeable lens apparatus 201 thereby to convert the optical image into an electric image signal, a liquid crystal display monitor 103 which displays an image signal converted by the image sensor 102, and a camera mount section 104. On the other hand, the interchangeable lens apparatus 201 includes the zoom lens system 202 according to any one of Embodiments 1 to 5, a lens barrel which holds the zoom lens system 202, and a lens mount section 204 connected to the camera mount section 104 of the camera body. The camera mount section 104 and the lens mount section 204 are connected to each other not only physically but also electrically, and function as interfaces. That is, a controller (not shown) inside the camera body 101 is electrically connected to a controller (not shown) inside the interchangeable lens apparatus 201, thereby achieving mutual signal communication.

The camera system 100 according to the present embodiment includes the zoom lens system 202 according to any one of Embodiments 1 to 5, and hence is capable of displaying an preferable optical image at the time of focusing in a live view state.

EXAMPLES

Hereinafter, numerical examples will be described below in which the zoom lens systems according to Embodiments 1 to 5 are implemented specifically. As will be described later, Numerical Examples 1 to 5 corresponds to Embodiments 1 to 5, respectively. Here, in each numerical example, the units of the length are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with "*" are aspheric surfaces, and the aspheric surface configuration is defined by the following formula.

$$Z = \frac{h^2/r}{1+\sqrt{1-(1+\kappa)(h/r)^2}} + \sum A_n h^n$$

Here, the symbols in the formula indicate the following quantities:

Z is the distance from an on-the-aspheric-surface point at a height h relative to the optical axis to a tangential plane at the top of the aspheric surface;

h is the height relative to the optical axis;

r is the radius of curvature at the top;

$\kappa$ is the conic constant; and $A_n$ is the n-th order aspheric coefficient.

FIGS. 2, 5, 8, 11, and 14 are longitudinal aberration diagrams of an infinity in-focus condition of the zoom lens systems according to Numerical Examples 1, 2, 3, 4, and 5.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)), and the distortion (DIS (%)). In each spherical aberration diagram, the vertical axis indicates the F-number (in each diagram, indicated as F), the solid line, the short dash line, and the long dash line indicate the characteristics to the d-line, the F-line, and the C-line, respectively. In each astigmatism diagram, the vertical axis indicates the image height (in each diagram, indicated as H), the solid line and the dash line indicate the characteristics to the sagittal image plane (in each diagram, indicated as "s") and the meridional image plane (in each diagram, indicated as "m"), respectively. In each distortion diagram, the vertical axis indicates the image height (in each diagram, indicated as H).

FIGS. 3, 6, 9, 12, and 15 are lateral aberration diagrams in a basic state where image blur compensation is not performed and in an image blur compensation state of a zoom lens system according to Numerical Examples 1, 2, 3, 4, and 5.

In each lateral aberration diagram, the aberration diagrams in the upper three parts correspond to a basic state where image blur compensation is not performed at a telephoto limit, while the aberration diagrams in the lower three parts correspond to an image blur compensation state at a telephoto limit where the sub lens unit (first sub lens unit or second sub lens unit) for image blur compensation included in the fourth lens unit G4 moves by a predetermined amount in a direction perpendicular to the optical axis. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. Further, in each lateral aberration diagram, the horizontal axis indicates the distance from the principal ray on the pupil surface, and the solid line, the short dash line, and the long dash line indicate the characteristics to the d-line, the F-line, and the C-line, respectively. In each lateral aberration diagram, the meridional image plane is adopted as the plane containing the optical axis of the first lens unit G1.

Here, in the zoom lens system according to each numerical example, the amount ($Y_T$(mm)) of movement of the compensation lens unit in a direction perpendicular to the optical axis in an image blur compensation state at a telephoto limit is as follows.

TABLE 1

(Amount of movement of compensation lens unit)

| Numerical Example | $Y_T$ |
|---|---|
| 1 | 0.307 |
| 2 | 0.316 |
| 3 | 0.319 |
| 4 | 0.307 |
| 5 | 0.308 |

Numerical Example 1

The zoom lens system of Numerical Example 1 corresponds to Embodiment 1 shown in FIG. 1. Data of the zoom lens system according to Numerical Example 1, i.e., the surface data, the aspheric surface data, the various data, the lens element data, the zoom lens unit data, and the zoom lens unit magnification are shown in Tables 2, 3, 4, 5, 6, and 7, respectively.

TABLE 2

(Surface data)

| Surface number | r | d | nd | vd |
|---|---|---|---|---|
| Object surface | ∞ | | | |
| 1 | 93.29160 | 1.49730 | 1.84666 | 23.8 |
| 2 | 50.82680 | 7.10180 | 1.49700 | 81.6 |
| 3 | −850.01520 | 0.15000 | | |
| 4 | 47.79330 | 5.18430 | 1.71300 | 53.9 |
| 5 | 149.47070 | Variable | | |
| 6* | 76.05160 | 0.10000 | 1.51358 | 51.6 |
| 7 | 53.79460 | 1.10000 | 1.88300 | 40.8 |
| 8 | 11.90020 | 6.30730 | | |
| 9 | −20.07120 | 0.83030 | 1.88300 | 40.8 |
| 10 | −51.30870 | 0.87050 | | |
| 11 | 31.52170 | 3.39400 | 1.94595 | 18.0 |
| 12 | −51.59310 | Variable | | |
| 13* | −19.66880 | 1.20040 | 1.80470 | 41.0 |
| 14* | 129.88760 | Variable | | |
| 15(Diaphragm) | ∞ | 0.84560 | | |
| 16* | 23.65630 | 3.02980 | 1.69350 | 53.2 |
| 17* | −55.43650 | 2.59200 | | |
| 18 | 15.08640 | 3.25030 | 1.71300 | 53.9 |
| 19 | −200.75790 | 0.81020 | 2.00069 | 25.5 |
| 20 | 15.26070 | 1.91050 | | |
| 21 | 31.27490 | 5.91480 | 1.59201 | 67.0 |
| 22* | −20.38770 | 0.89910 | | |
| 23 | 88.68500 | 2.96870 | 1.80518 | 25.5 |
| 24 | −13.73040 | 0.80000 | 1.83481 | 42.7 |
| 25 | 16.65510 | 2.35020 | | |
| 26 | 23.27780 | 4.19350 | 1.49700 | 81.6 |
| 27 | −14.99240 | 0.80000 | 1.83481 | 42.7 |
| 28 | −57.80160 | 1.35890 | | |
| 29 | −14.16000 | 0.80000 | 1.72916 | 54.7 |
| 30 | −26.58250 | 0.10000 | | |
| 31 | 32.36170 | 3.20070 | 1.51680 | 64.2 |
| 32 | −81.55460 | Variable | | |
| 33 | ∞ | 4.20000 | 1.51680 | 64.2 |
| 34 | ∞ | BF | | |
| image surface | ∞ | | | |

TABLE 3

(Aspheric surface data)

| Surface No. | Parameters |
|---|---|
| 6 | K = −9.51780E−01, A4 = 2.71746E−05, A6 = −1.19865E−08, A8 = −8.37911E−10, A10 = 5.57759E−12, A12 = −1.15782E−14 |
| 13 | K = 0.00000E+00, A4 = −3.91729E−05, A6 = 1.79189E−06, A8 = −3.13080E−08, A10 = 1.39737E−10, A12 = 2.27477E−12 |
| 14 | K = −1.79163E−01, A4 = −4.45555E−05, A6 = 2.19191E−06, A8 = −5.22554E−08, A10 = 5.17499E−10, A12 = −1.04173E−13 |
| 16 | K = 0.00000E+00, A4 = −1.12821E−05, A6 = 1.40905E−07, A8 = −2.71306E−09, A10 = −7.19478E−11, A12 = −7.19829E−15 |
| 17 | K = 0.00000E+00, A4 = 2.44778E−05, A6 = −3.84078E−08, A8 = 1.18435E−09, A10 = −1.10289E−10, A12 = 7.33811E−15 |
| 22 | K = 0.00000E+00, A4 = 1.81139E−05, A6 = −5.84158E−08, A8 = 6.50501E−09, A10 = −6.84134E−11, A12 = 0.00000E+00 |

TABLE 4

(Various data)
Zooming ratio 9.33675

| | Wide | Middle | Telephoto |
|---|---|---|---|
| Focal length | 14.4919 | 44.3151 | 135.3070 |
| F-number | 4.00318 | 5.40622 | 5.99766 |
| View angle | 39.8611 | 13.7123 | 4.5845 |
| Image height | 10.8150 | 10.8150 | 10.8150 |
| Overall length of lens system | 101.9455 | 132.7027 | 162.8905 |
| BF | 2.80549 | 2.83204 | 2.87020 |
| d5 | 0.6596 | 22.5410 | 41.6141 |
| d12 | 2.8371 | 3.0868 | 6.1035 |
| d14 | 18.4343 | 8.8238 | 2.7427 |
| d32 | 9.4488 | 27.6589 | 41.7998 |
| Entrance pupil position | 25.3181 | 78.7228 | 223.8111 |
| Exit pupil position | −37.3774 | −55.5875 | −69.7284 |
| Front principal point position | 34.5835 | 89.4220 | 106.9372 |
| Back principal point position | 87.4536 | 88.3877 | 27.5835 |

TABLE 5

(Lens element data)

| Unit | Initial surface No. | Focal length |
|---|---|---|
| 1 | 1 | −134.0520 |
| 2 | 2 | 96.7509 |
| 3 | 4 | 96.4914 |
| 4 | 6 | −16.6778 |
| 5 | 9 | −37.8072 |
| 6 | 11 | 21.1040 |
| 7 | 13 | −21.1522 |
| 8 | 16 | 24.2899 |
| 9 | 18 | 19.8043 |
| 10 | 19 | −14.1462 |
| 11 | 21 | 21.7746 |
| 12 | 23 | 14.9598 |
| 13 | 24 | −8.9085 |
| 14 | 26 | 19.0411 |
| 15 | 27 | −24.4565 |
| 16 | 29 | −42.7154 |
| 17 | 31 | 45.2638 |

TABLE 6

(Zoom lens unit data)

| Unit | Initial surface No. | Focal length | Length of lens unit | Front principal point position | Back principal point position |
|---|---|---|---|---|---|
| 1 | 1 | 76.72300 | 13.93340 | 3.26962 | 8.46360 |
| 2 | 6 | −46.93302 | 12.60210 | −10.83666 | −15.28913 |
| 3 | 13 | −21.15218 | 1.20040 | 0.08717 | 0.62478 |
| 4 | 15 | 19.37772 | 35.82430 | 0.10418 | 10.76940 |

TABLE 7

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 6 | −1.36049 | −3.72016 | 7.26826 |
| 3 | 13 | 0.12997 | 0.07727 | −0.08852 |
| 4 | 15 | −1.06826 | −2.00938 | −2.74110 |

Numerical Example 2

Figure 4:
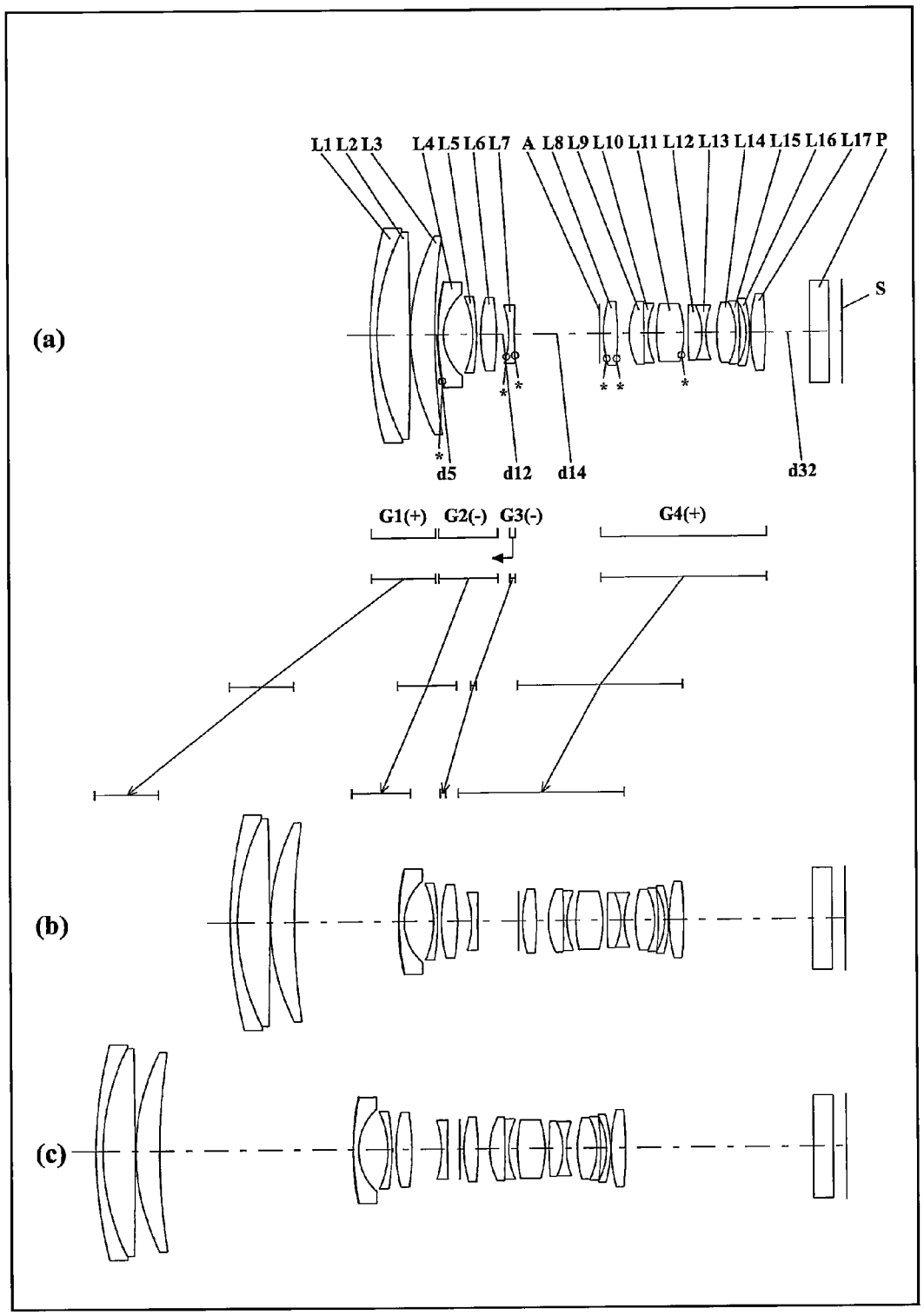
FIG. 4 is a lens arrangement diagram showing an infinity in-focus condition of a zoom lens system according to Embodiment 2 (Example 2)
Figure 5:
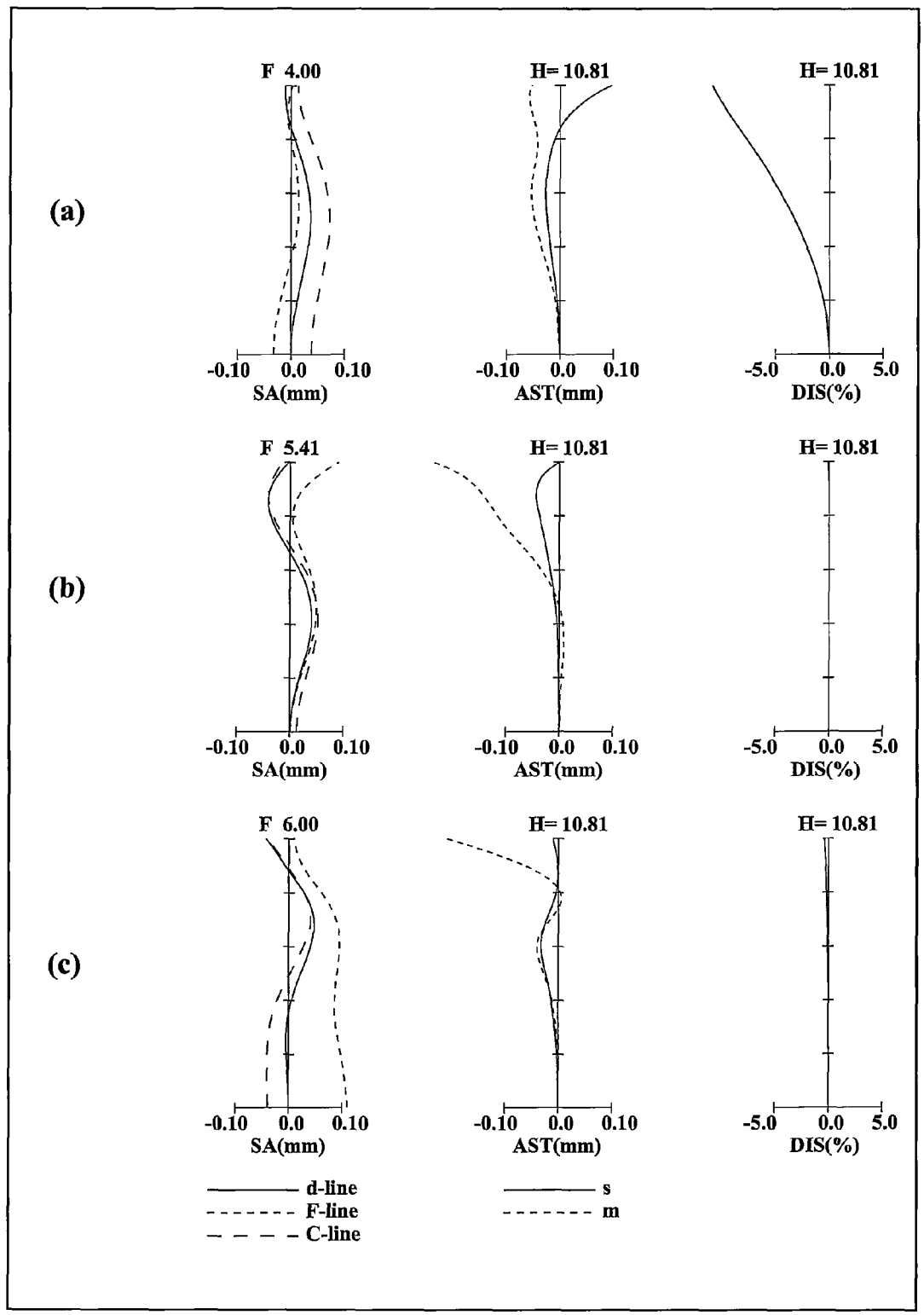
FIG. 5 is a longitudinal aberration diagram showing an infinity in-focus condition of a zoom lens system according to Example 2.
Figure 6:
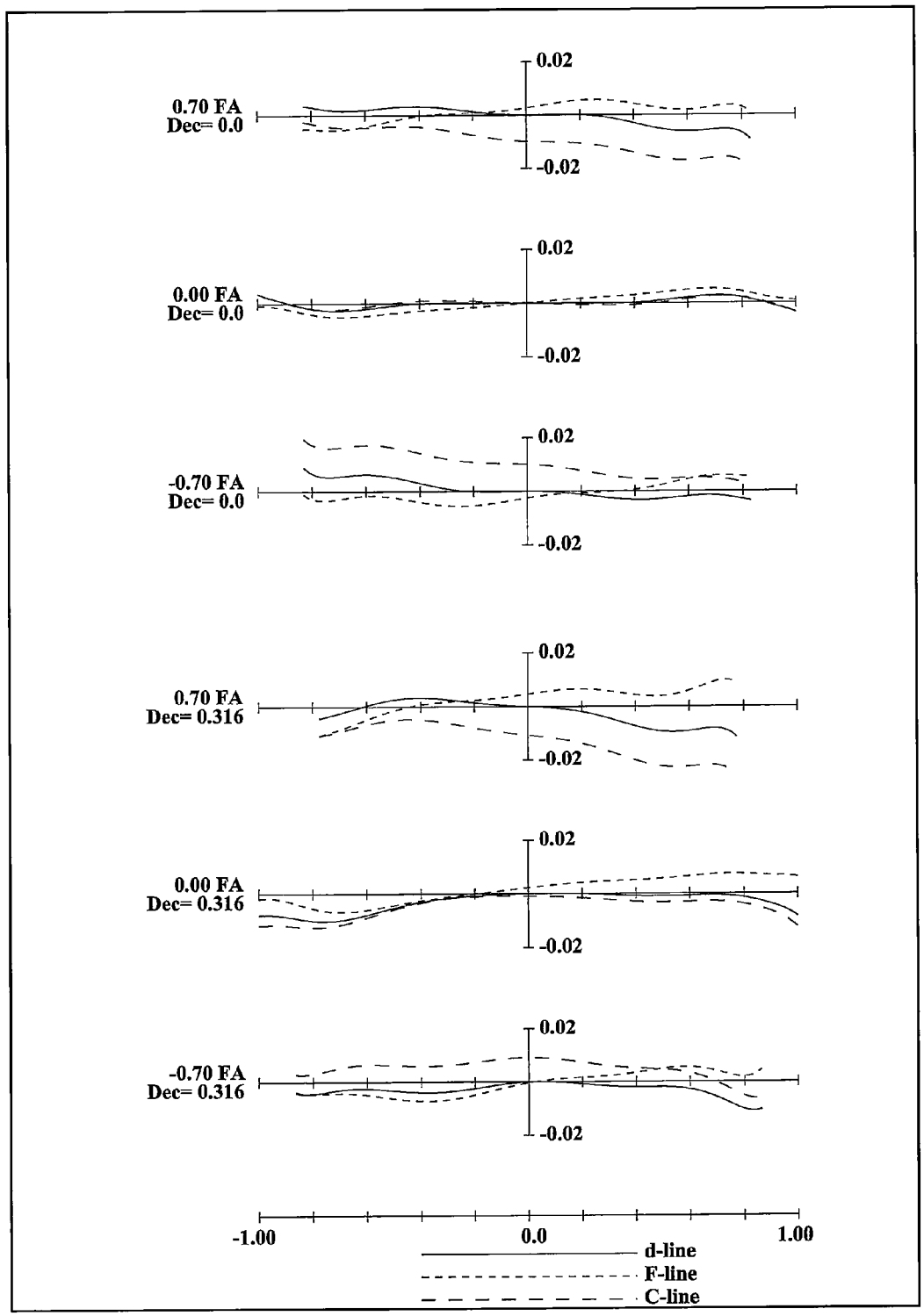
FIG. 6 is a lateral aberration diagram in a basic state where image blur compensation is not performed and in an image blur compensation state at a telephoto limit of a zoom lens system according to Example 2.

The zoom lens system of Numerical Example 2 corresponds to Embodiment 2 shown in FIG. 4. Data of the zoom lens system of Numerical Example 2, i.e., the surface data, the aspheric surface data, the various data, the lens element data, the zoom lens unit data, and the zoom lens unit magnification are shown in Tables 8, 9, 10, 11, 12, and 13, respectively.

TABLE 8

(Surface data)

| Surface number | r | d | nd | vd |
|---|---|---|---|---|
| Object surface | ∞ | | | |
| 1 | 92.44320 | 1.50040 | 1.84666 | 23.8 |
| 2 | 50.47000 | 6.96430 | 1.49700 | 81.6 |
| 3 | −847.86000 | 0.15000 | | |
| 4 | 47.25220 | 5.18030 | 1.71300 | 53.9 |
| 5 | 145.99490 | Variable | | |
| 6* | 76.11200 | 0.10120 | 1.51358 | 51.6 |
| 7 | 53.78650 | 1.10000 | 1.88300 | 40.8 |
| 8 | 11.89720 | 6.31220 | | |
| 9 | −19.99880 | 0.83260 | 1.88300 | 40.8 |
| 10 | −51.23580 | 0.87230 | | |
| 11 | 31.55930 | 3.41140 | 1.94595 | 18.0 |
| 12 | −51.41040 | Variable | | |
| 13* | −19.63500 | 1.20060 | 1.80470 | 41.0 |
| 14* | 130.38440 | Variable | | |
| 15(Diaphragm) | ∞ | 0.84590 | | |
| 16* | 23.66010 | 3.04770 | 1.69350 | 53.2 |
| 17* | −55.50020 | 2.53870 | | |
| 18 | 15.07960 | 3.25040 | 1.71300 | 53.9 |
| 19 | −200.13220 | 0.81020 | 2.00069 | 25.5 |
| 20 | 15.26060 | 1.91230 | | |
| 21 | 31.28720 | 5.87150 | 1.59201 | 67.0 |
| 22* | −20.38280 | 0.89910 | | |
| 23 | 88.69790 | 2.96860 | 1.80518 | 25.5 |
| 24 | −13.74920 | 0.80050 | 1.83481 | 42.7 |
| 25 | 16.65470 | 2.35520 | | |
| 26 | 23.28540 | 4.19220 | 1.49700 | 81.6 |
| 27 | −15.00380 | 0.80660 | 1.83481 | 42.7 |
| 28 | −57.73780 | 1.34160 | | |
| 29 | −14.16980 | 0.82280 | 1.72916 | 54.7 |
| 30 | −26.59680 | 0.14240 | | |
| 31 | 32.16560 | 3.16330 | 1.51680 | 64.2 |
| 32 | −83.11460 | Variable | | |
| 33 | ∞ | 4.20000 | 1.51680 | 64.2 |

TABLE 8-continued (Surface data)

| Surface number | r | d | nd | vd |
|---|---|---|---|---|
| 34 | ∞ | BF | | |
| Image surface | ∞ | | | |

TABLE 9

(Aspherical data)

| Surface No. | Parameters |
|---|---|
| 6 | K = −8.65420E−01, A4 = 2.71985E−05, A6 = −1.27416E−08, A8 = −8.47671E−10, A10 = 5.59117E−12, A12 = −1.03453E−14 |
| 13 | K = 0.00000E+00, A4 = −3.92219E−05, A6 = 1.79165E−06, A8 = −3.13018E−08, A10 = 1.39699E−10, A12 = 2.24266E−12 |
| 14 | K = 5.23028E−01, A4 = −4.45154E−05, A6 = 2.19210E−06, A8 = −5.22781E−08, A10 = 5.16605E−10, A12 = −1.29893E−13 |
| 16 | K = 0.00000E+00, A4 = −1.12931E−05, A6 = 1.40885E−07, A8 = −2.71412E−09, A10 = −7.20168E−11, A12 = −9.67929E−15 |
| 17 | K = 0.00000E+00, A4 = 2.44916E−05, A6 = −3.83424E−08, A8 = 1.18545E−09, A10 = −1.10236E−10, A12 = 9.17521E−15 |
| 22 | K = 4.76603E−05, A4 = 1.81709E−05, A6 = −5.78282E−08, A8 = 6.49528E−09, A10 = −6.93375E−11, A12 = 0.00000E+00 |

TABLE 10

(Various data)
Zooming ratio 9.35820

| | Wide | Middle | Telephoto |
|---|---|---|---|
| Focal length | 14.4939 | 44.3129 | 135.6373 |
| F-number | 4.00335 | 5.40554 | 5.99765 |
| View angle | 39.9177 | 13.7265 | 4.5757 |
| Image height | 10.8150 | 10.8150 | 10.8150 |
| Overall length of lens system | 101.6672 | 132.4129 | 161.5468 |
| BF | 2.80409 | 2.82823 | 2.86170 |
| d5 | 0.6595 | 22.4493 | 41.6494 |
| d12 | 2.6575 | 3.0940 | 6.3380 |
| d14 | 18.4611 | 8.8422 | 2.7298 |
| d32 | 9.4907 | 27.6049 | 40.3736 |
| Entrance pupil position | 25.1796 | 78.8630 | 230.4632 |
| Exit pupil position | −37.4743 | −55.5885 | −68.3572 |
| Front principal point position | 34.4580 | 89.5616 | 107.7774 |
| Back principal point position | 87.1732 | 88.1000 | 25.9095 |

TABLE 11

(Lens element data)

| Unit | Initial surface No. | Focal length |
|---|---|---|
| 1 | 1 | −133.4756 |
| 2 | 2 | 96.0920 |
| 3 | 4 | 95.8923 |
| 4 | 6 | −16.6715 |
| 5 | 9 | −37.6192 |
| 6 | 11 | 21.0941 |
| 7 | 13 | −21.1314 |
| 8 | 16 | 24.3029 |
| 9 | 18 | 19.7920 |
| 10 | 19 | −14.1429 |

TABLE 11-continued (Lens element data)

| Unit | Initial surface No. | Focal length |
|---|---|---|
| 11 | 21 | 21.7676 |
| 12 | 23 | 14.9778 |
| 13 | 24 | −8.9151 |
| 14 | 26 | 19.0518 |
| 15 | 27 | −24.4932 |
| 16 | 29 | −42.7860 |
| 17 | 31 | 45.2974 |

TABLE 12

(Zoom lens unit data)

| Unit | Initial surface No. | Focal length | Length of lens unit | Front principal point position | Back principal point position |
|---|---|---|---|---|---|
| 1 | 1 | 76.12978 | 13.79500 | 3.16804 | 8.32000 |
| 2 | 6 | −46.72192 | 12.62970 | −10.78714 | −15.22577 |
| 3 | 13 | −21.13139 | 1.20060 | 0.08676 | 0.62446 |
| 4 | 15 | 19.40387 | 35.76900 | 0.15790 | 10.71360 |

TABLE 13

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 6 | −1.37173 | −3.80760 | 6.74257 |
| 3 | 13 | 0.13000 | 0.07635 | −0.09926 |
| 4 | 15 | −1.06759 | −2.00237 | −2.66214 |

Numerical Example 3

Figure 7:
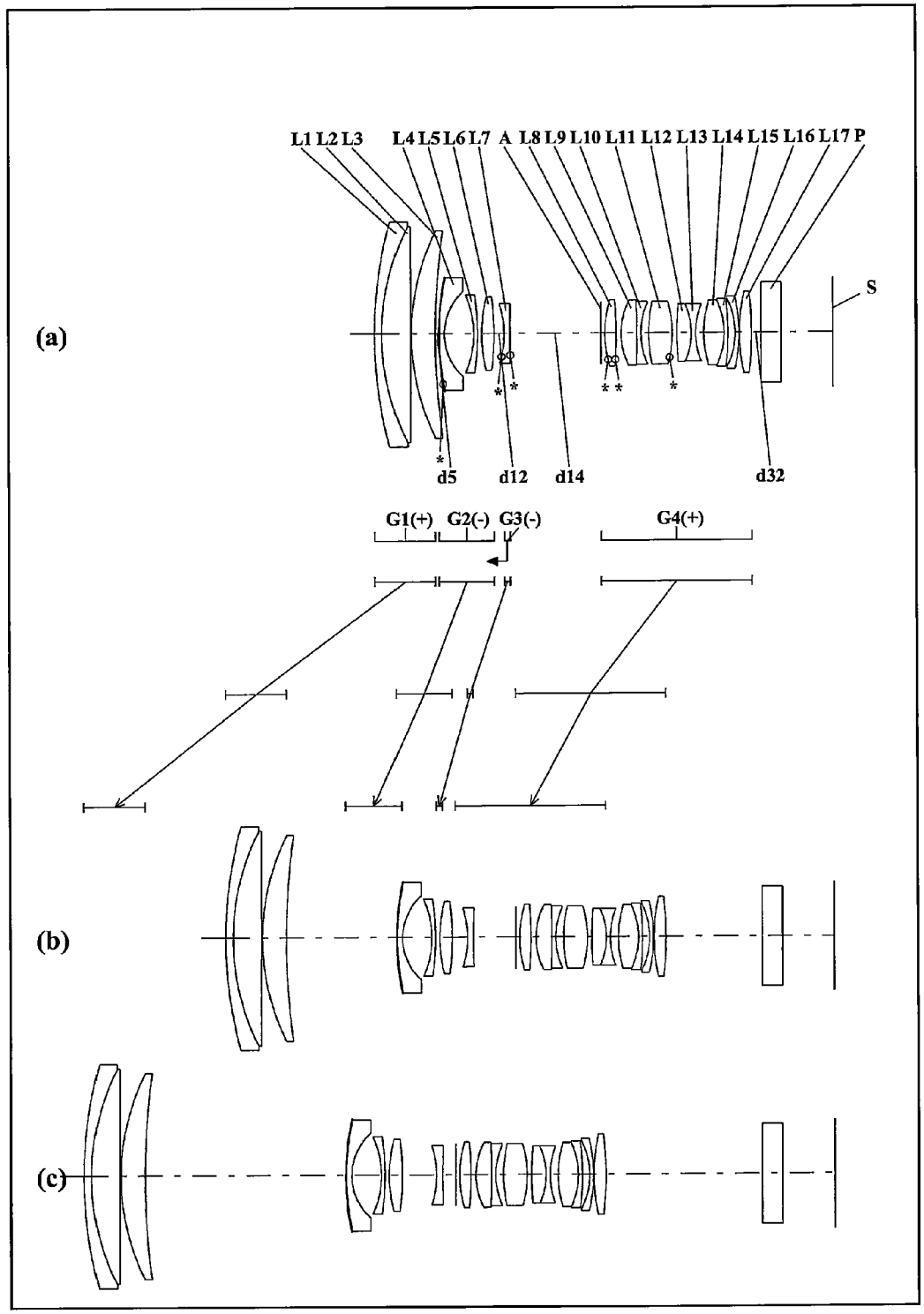
FIG. 7 is a lens arrangement diagram showing an infinity in-focus condition of a zoom lens system according to Embodiment 3 (Example 3)
Figure 8:
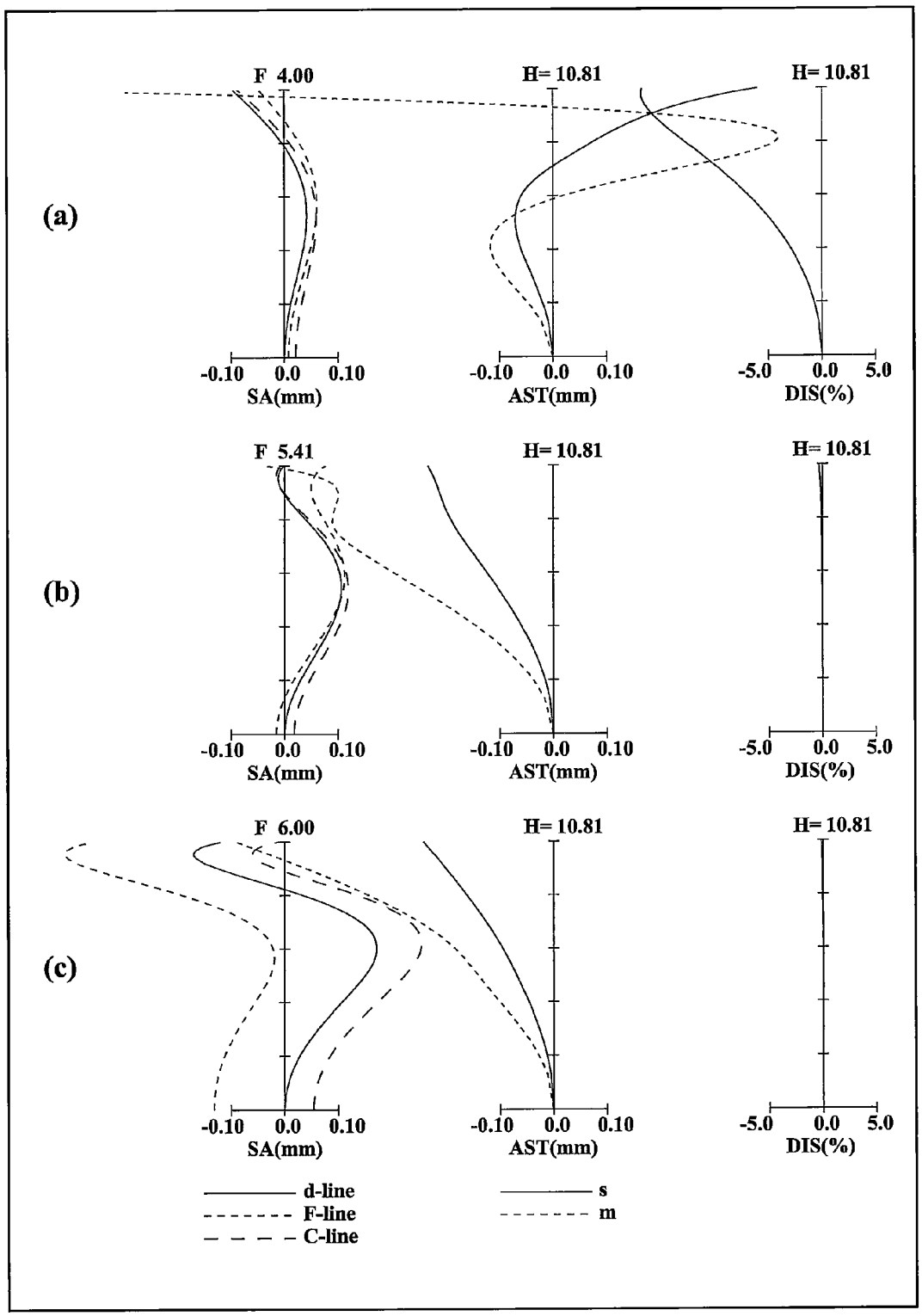
FIG. 8 is a longitudinal aberration diagram showing an infinity in-focus condition of a zoom lens system according to Example 3.
Figure 9:
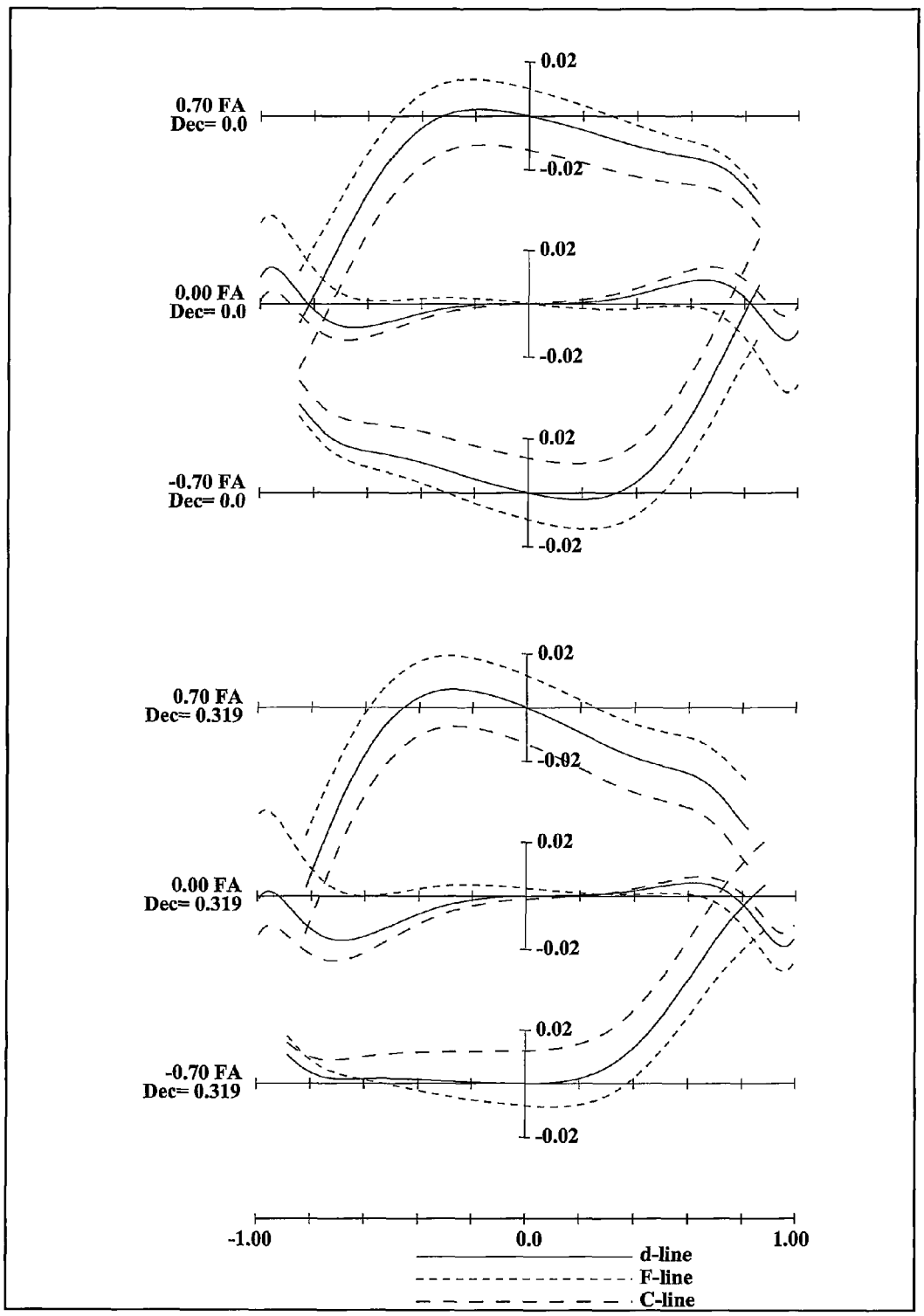
FIG. 9 is a lateral aberration diagram in a basic state where image blur compensation is not performed and in an image blur compensation state at a telephoto limit of a zoom lens system according to Example 3.

The zoom lens system of Numerical Example 3 corresponds to Embodiment 3 shown in FIG. 7. Data of the zoom lens system of Numerical Example 3, i.e., the surface data, the aspheric surface data, the various data, the lens element data, the zoom lens unit data, and the zoom lens unit magnification are shown in Tables 14, 15, 16, 17, 18, and 19, respectively.

TABLE 14

(Surface data)

| Surface number | r | d | nd | vd |
|---|---|---|---|---|
| Object surface | ∞ | | | |
| 1 | 87.57360 | 1.50040 | 1.84666 | 23.8 |
| 2 | 49.16650 | 5.95510 | 1.49700 | 81.6 |
| 3 | −2809.37530 | 0.15000 | | |
| 4 | 47.74460 | 4.98760 | 1.71300 | 53.9 |
| 5 | 153.09470 | Variable | | |
| 6* | 73.99720 | 0.10000 | 1.51358 | 51.6 |
| 7 | 52.32450 | 1.10000 | 1.88300 | 40.8 |
| 8 | 11.87980 | 6.08650 | | |
| 9 | −19.94860 | 0.80350 | 1.88300 | 40.8 |
| 10 | −51.95340 | 0.84480 | | |
| 11 | 29.62330 | 2.59210 | 1.94595 | 18.0 |
| 12 | −56.59100 | Variable | | |
| 13* | −19.86560 | 1.20660 | 1.80420 | 46.5 |
| 14* | 121.10780 | Variable | | |
| 15(Diaphragm) | ∞ | 0.81880 | | |
| 16* | 23.31780 | 2.36020 | 1.69400 | 56.3 |
| 17* | −61.41970 | 1.01400 | | |
| 18 | 14.71050 | 3.27940 | 1.71300 | 53.9 |
| 19 | −214.88630 | 0.84300 | 2.00069 | 25.5 |
| 20 | 15.15610 | 1.61840 | | |
| 21 | 29.47780 | 4.92500 | 1.59201 | 67.0 |
| 22* | −21.29430 | 0.94140 | | |
| 23 | 84.78160 | 3.00080 | 1.80519 | 25.4 |
| 24 | −13.99680 | 0.83390 | 1.83481 | 42.7 |
| 25 | 16.54600 | 1.65990 | | |
| 26 | 22.59390 | 4.20830 | 1.49700 | 81.6 |
| 27 | −15.32610 | 0.80000 | 1.83481 | 42.7 |
| 28 | −61.45340 | 1.49380 | | |
| 29 | −15.39840 | 0.80000 | 1.72600 | 53.4 |
| 30 | −31.40970 | 0.10000 | | |
| 31 | 36.45700 | 2.50420 | 1.51633 | 64.0 |
| 32 | −64.85300 | Variable | | |
| 33 | ∞ | 4.20000 | 1.51680 | 64.2 |
| 34 | ∞ | BF | | |
| Image surface | ∞ | | | |

TABLE 15

(Aspheric surface data)

| Surface No. | Parameters |
|---|---|
| 6 | K = −4.63021E+00, A4 = 2.48887E−05, A6 = −8.40845E−08, A8 = −7.99164E−10, A10 = 8.24811E−12, A12 = −1.11332E−14 |
| 13 | K = 0.00000E+00, A4 = −4.90964E−05, A6 = 1.59884E−06, A8 = −3.80642E−08, A10 = 1.89425E−11, A12 = 6.27292E−12 |
| 14 | K = −4.80635E+01, A4 = −4.73983E−05, A6 = 1.93516E−06, A8 = −5.59716E−08, A10 = 5.06744E−10, A12 = 7.60511E−13 |
| 16 | K = 0.00000E+00, A4 = −8.98901E−06, A6 = 1.86825E−07, A8 = −2.18893E−09, A10 = −6.51294E−11, A12 = −7.88436E−14 |
| 17 | K = 0.00000E+00, A4 = 2.49414E−05, A6 = −5.17973E−08, A8 = 1.07578E−09, A10 = −1.09559E−10, A12 = 2.62430E−13 |
| 22 | K = 0.00000E+00, A4 = 3.00044E−05, A6 = 9.15117E−08, A8 = 7.25391E−09, A10 = −7.93499E−11, A12 = 0.00000E+00 |

TABLE 16

(Various data)
Zooming ratio 9.74613

| | Wide | Middle | Telephoto |
|---|---|---|---|
| Focal length | 13.8816 | 44.3100 | 135.2916 |
| F-number | 4.00307 | 5.40538 | 5.99705 |
| View angle | 43.0929 | 13.7615 | 4.5780 |
| Image height | 10.8150 | 10.8150 | 10.8150 |
| Overall length of lens system | 95.0223 | 125.9994 | 155.4293 |
| BF | 10.69149 | 10.71602 | 10.74727 |
| d5 | 0.6598 | 22.7406 | 41.7210 |
| d12 | 2.0929 | 3.2189 | 7.1676 |
| d14 | 18.9120 | 8.7968 | 2.7269 |
| d32 | 1.9384 | 19.7994 | 32.3388 |
| Entrance pupil position | 23.9379 | 78.2752 | 229.2315 |
| Exit pupil position | −25.6011 | −43.4621 | −56.0015 |
| Front principal point position | 32.5099 | 86.3459 | 90.3034 |
| Back principal point position | 81.1407 | 81.6894 | 20.1377 |

TABLE 17

(Lens element data)

| Unit | Initial surface No. | Focal length |
|---|---|---|
| 1 | 1 | −134.8246 |
| 2 | 2 | 97.2929 |
| 3 | 4 | 95.4300 |
| 4 | 6 | −16.7536 |
| 5 | 9 | −37.1102 |
| 6 | 11 | 20.8607 |
| 7 | 13 | −21.1407 |
| 8 | 16 | 24.6347 |
| 9 | 18 | 19.4254 |
| 10 | 19 | −14.1219 |
| 11 | 21 | 21.6649 |
| 12 | 23 | 15.1251 |
| 13 | 24 | −8.9715 |
| 14 | 26 | 19.0767 |
| 15 | 27 | −24.6532 |
| 16 | 29 | −42.5012 |
| 17 | 31 | 45.5830 |

TABLE 18

(Zoom lens unit data)

| Unit | Initial surface No. | Focal length | Length of lens unit | Front principal point position | Back principal point position |
|---|---|---|---|---|---|
| 1 | 1 | 76.29653 | 12.59310 | 2.55334 | 7.29477 |
| 2 | 6 | −44.71579 | 11.52690 | −9.49042 | −13.10859 |
| 3 | 13 | −21.14067 | 1.20660 | 0.09388 | 0.63425 |
| 4 | 15 | 18.47165 | 31.20110 | −0.89867 | 9.45045 |

TABLE 19

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 6 | −1.27348 | −3.43117 | 7.51757 |
| 3 | 13 | 0.14129 | 0.08551 | −0.08868 |
| 4 | 15 | −1.01117 | −1.97943 | −2.65997 |

Numerical Example 4

Figure 10:
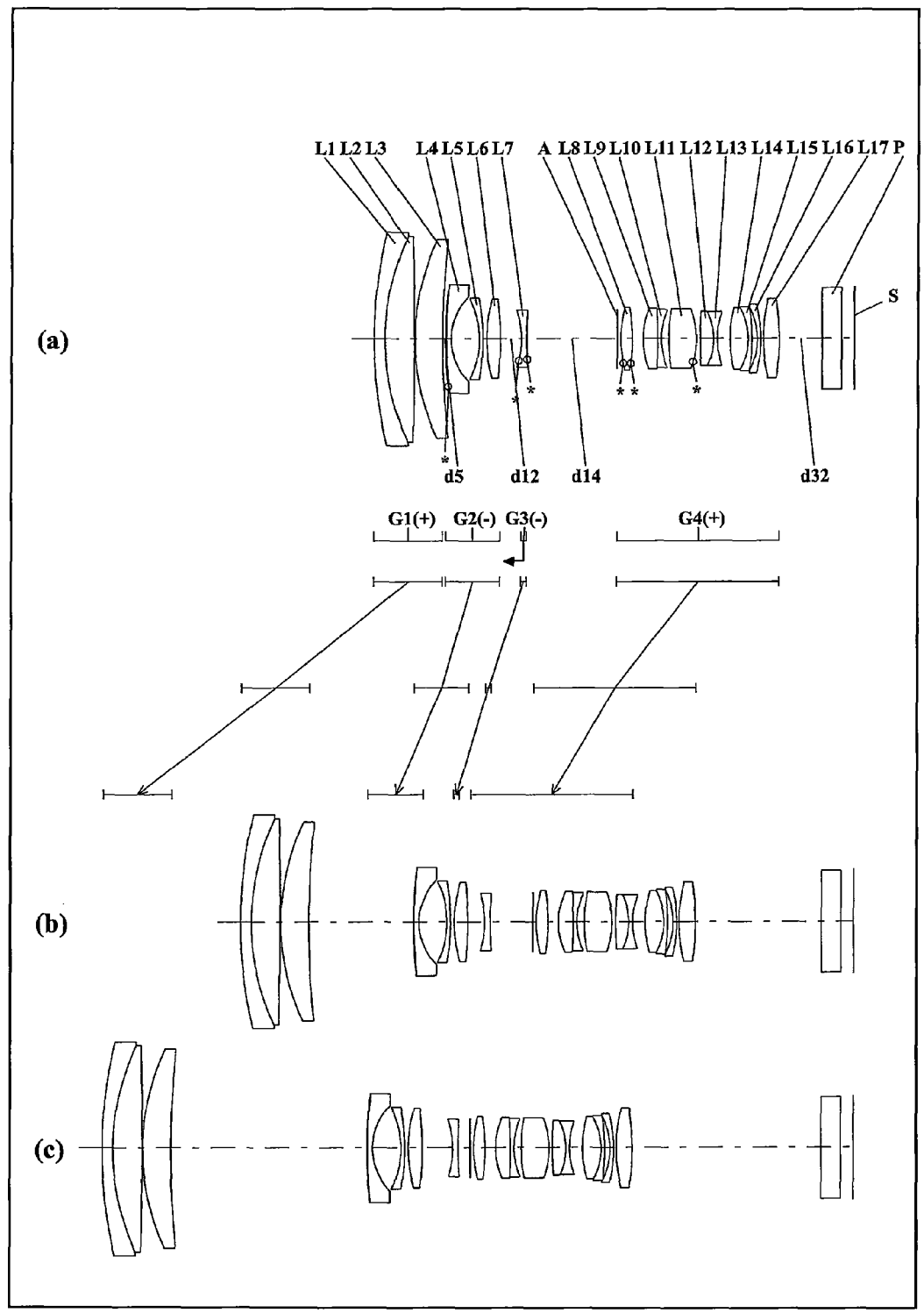
FIG. 10 is a lens arrangement diagram showing an infinity in-focus condition of a zoom lens system according to Embodiment 4 (Example 4)
Figure 11:
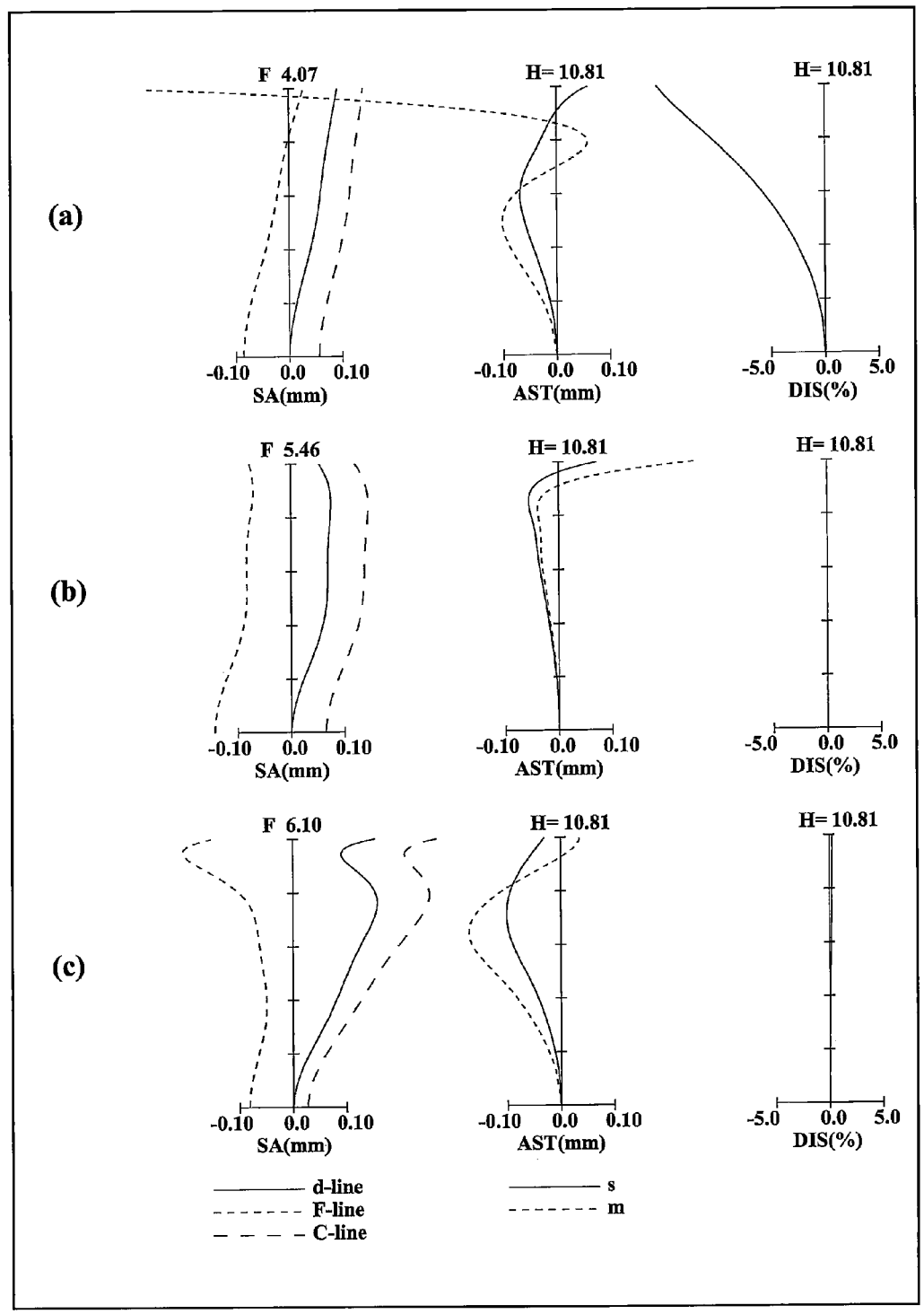
FIG. 11 is a longitudinal aberration diagram showing an infinity in-focus condition of a zoom lens system according to Example 4.
Figure 12:
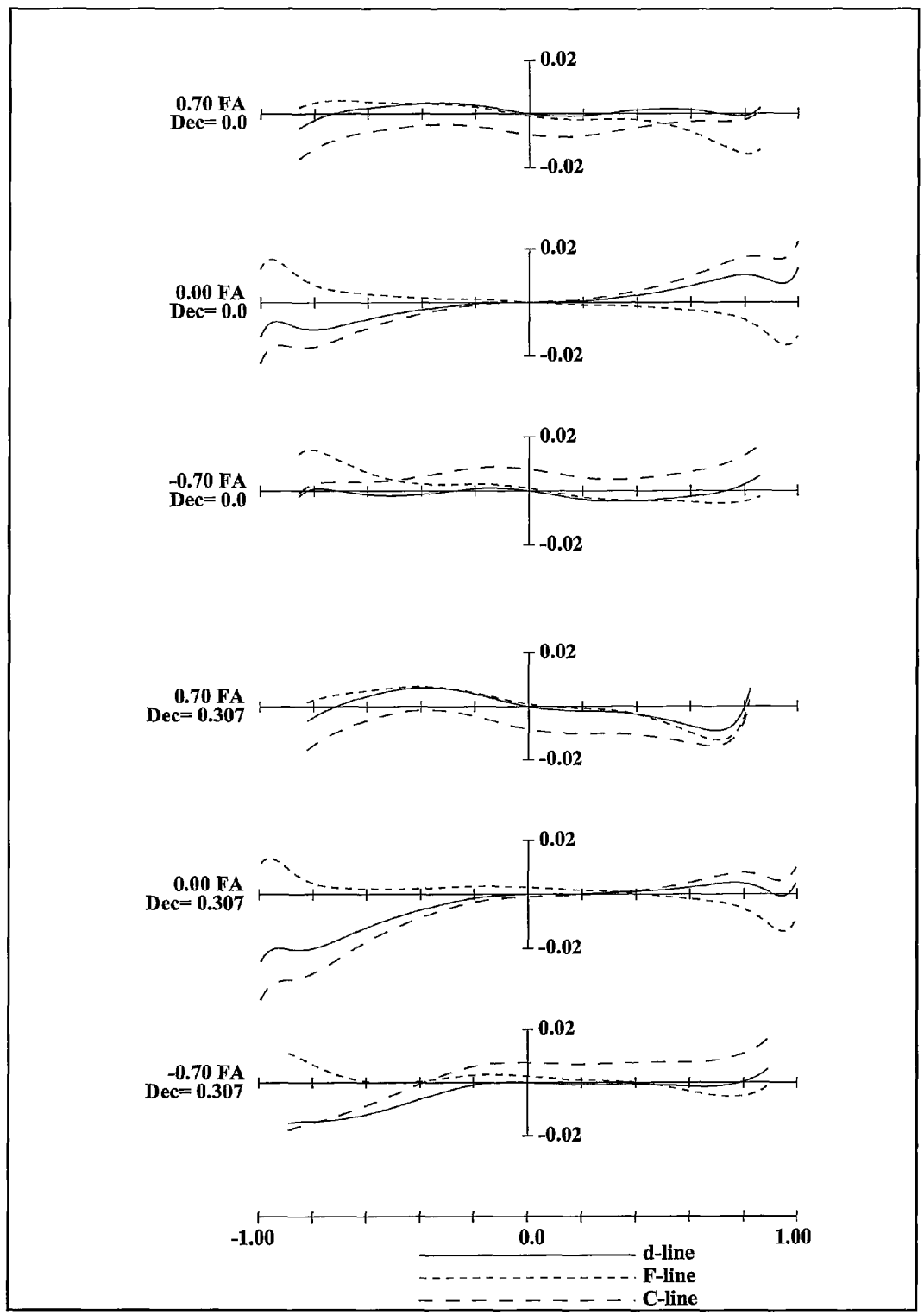
FIG. 12 is a lateral aberration diagram in a basic state where image blur compensation is not performed and in an image blur compensation state at a telephoto limit of a zoom lens system according to Example 4.

The zoom lens system of Numerical Example 4 corresponds to Embodiment 4 shown in FIG. 10. Data of the zoom lens system of Numerical Example 4, i.e., the surface data, the aspheric surface data, the various data, the lens element data, the zoom lens unit data, and the zoom lens unit magnification are shown in Tables 20, 21, 22, 23, 24, and 25, respectively.

TABLE 20

(Surface data)

| Surface number | r | d | nd | vd |
|---|---|---|---|---|
| Object surface | ∞ | | | |
| 1 | 99.13980 | 2.33470 | 1.84666 | 23.8 |
| 2 | 52.37110 | 6.32020 | 1.49700 | 81.6 |
| 3 | −925.21640 | 0.15000 | | |
| 4 | 50.90900 | 6.04860 | 1.70030 | 47.8 |
| 5 | 202.89160 | Variable | | |
| 6* | 152.65080 | 0.10000 | 1.51358 | 51.6 |
| 7 | 100.84460 | 1.10000 | 1.89800 | 34.0 |
| 8 | 13.12860 | 6.11220 | | |
| 9 | −20.13630 | 0.80270 | 1.88300 | 40.8 |
| 10 | −48.43050 | 0.81260 | | |
| 11 | 31.27340 | 2.98540 | 1.94595 | 18.0 |
| 12 | −72.10650 | Variable | | |
| 13* | −22.74160 | 1.21130 | 1.69385 | 53.1 |
| 14* | 82.01060 | Variable | | |
| 15(Diaphragm) | ∞ | 0.78470 | | |
| 16* | 23.93290 | 2.51070 | 1.69200 | 50.6 |
| 17* | −43.28550 | 2.32970 | | |
| 18 | 16.54990 | 3.17420 | 1.71300 | 53.9 |
| 19 | −158.78700 | 0.80930 | 2.00069 | 25.5 |
| 20 | 15.49850 | 1.59880 | | |
| 21 | 34.82310 | 6.01540 | 1.59201 | 67.0 |
| 22* | −18.77570 | 0.80130 | | |
| 23 | 102.39450 | 2.86260 | 1.80486 | 24.7 |
| 24 | −13.35880 | 0.81220 | 1.83481 | 42.7 |
| 25 | 16.79090 | 2.77270 | | |
| 26 | 25.43580 | 4.02130 | 1.49700 | 81.6 |
| 27 | −13.97530 | 0.80000 | 1.83770 | 42.0 |
| 28 | −49.24400 | 1.17460 | | |
| 29 | −15.17760 | 0.80000 | 1.72600 | 53.4 |
| 30 | −30.15640 | 0.54070 | | |
| 31 | 36.40460 | 3.43470 | 1.51680 | 64.2 |
| 32 | −61.98770 | Variable | | |
| 33 | ∞ | 4.20000 | 1.51680 | 64.2 |
| 34 | ∞ | BF | | |
| Image surface | ∞ | | | |

TABLE 21

(Aspheric surface data)

| Surface No. | Parameters |
|---|---|
| 6 | K = −1.52252E+01, A4 = 2.52697E−05, A6 = −5.64467E−08, A8 = −7.35157E−10, A10 = 6.02872E−12, A12 = −1.20876E−14 |
| 13 | K = 0.00000E+00, A4 = −1.18627E−04, A6 = 3.31215E−06, A8 = −4.98682E−08, A10 = 3.82451E−10, A12 = −1.56034E−12 |
| 14 | K = −2.46760E+02, A4 = −5.33359E−05, A6 = 2.42750E−06, A8 = −4.25379E−08, A10 = 3.50327E−10, A12 = −9.42154E−13 |
| 16 | K = 0.00000E+00, A4 = −1.88639E−05, A6 = −1.68630E−07, A8 = −2.47382E−09, A10 = 8.88812E−12, A12 = −1.49176E−12 |
| 17 | K = 0.00000E+00, A4 = 2.44994E−05, A6 = −3.99045E−07, A8 = 6.20417E−09, A10 = −1.58881E−10, A12 = −1.93090E−13 |
| 22 | K = 0.00000E+00, A4 = −1.60567E−06, A6 = 2.26576E−07, A8 = −7.00856E−09, A10 = 7.69602E−11, A12 = 0.00000E+00 |

TABLE 22

(Various data)
Zooming ratio 9.35774

| | Wide | Middle | Telephoto |
|---|---|---|---|
| Focal length | 14.4729 | 44.3138 | 135.4335 |
| F-number | 4.07421 | 5.46288 | 6.09784 |
| View angle | 41.5356 | 13.7140 | 4.5535 |
| Image height | 10.8150 | 10.8150 | 10.8150 |
| Overall length of lens system | 104.5484 | 133.3466 | 163.1344 |
| BF | 2.80096 | 2.83119 | 2.86074 |
| d5 | 0.6600 | 22.7257 | 42.6368 |
| d12 | 4.5590 | 3.6343 | 6.6550 |
| d14 | 19.6493 | 9.2648 | 2.5625 |
| d32 | 9.4585 | 27.4700 | 40.9988 |

TABLE 22-continued (Various data)
Zooming ratio 9.35774

|  | Wide | Middle | Telephoto |
|---|---|---|---|
| Entrance pupil position | 26.6243 | 79.8886 | 230.8777 |
| Exit pupil position | −38.2148 | −56.2263 | −69.7551 |
| Front principal point position | 35.9902 | 90.9515 | 113.7186 |
| Back principal point position | 90.0755 | 89.0328 | 27.7009 |

TABLE 23

(Lens element data)

| Unit | Initial surface No. | Focal length |
|---|---|---|
| 1 | 1 | −134.1927 |
| 2 | 2 | 99.9445 |
| 3 | 4 | 95.4590 |
| 4 | 6 | −16.4137 |
| 5 | 9 | −39.5601 |
| 6 | 11 | 23.3877 |
| 7 | 13 | −25.5395 |
| 8 | 16 | 22.6167 |
| 9 | 18 | 21.1803 |
| 10 | 19 | −14.0778 |
| 11 | 21 | 21.5026 |
| 12 | 23 | 14.8460 |
| 13 | 24 | −8.8040 |
| 14 | 26 | 18.7846 |
| 15 | 27 | −23.5370 |
| 16 | 29 | −43.0564 |
| 17 | 31 | 44.9134 |

TABLE 24

(Zoom lens unit data)

| Unit | Initial surface No. | Focal length | Length of lens unit | Front principal point position | Back principal point position |
|---|---|---|---|---|---|
| 1 | 1 | 78.33422 | 14.85350 | 3.25903 | 8.89267 |
| 2 | 6 | −34.33959 | 11.91290 | −6.12097 | −7.76739 |
| 3 | 13 | −25.53954 | 1.21130 | 0.15452 | 0.65407 |
| 4 | 15 | 20.22408 | 35.24290 | 0.14983 | 9.40650 |

TABLE 25

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 6 | −0.78951 | −1.60248 | −22.62201 |
| 3 | 13 | 0.22929 | 0.18457 | 0.02959 |
| 4 | 15 | −1.02060 | −1.91270 | −2.58310 |

Numerical Example 5

Figure 13:
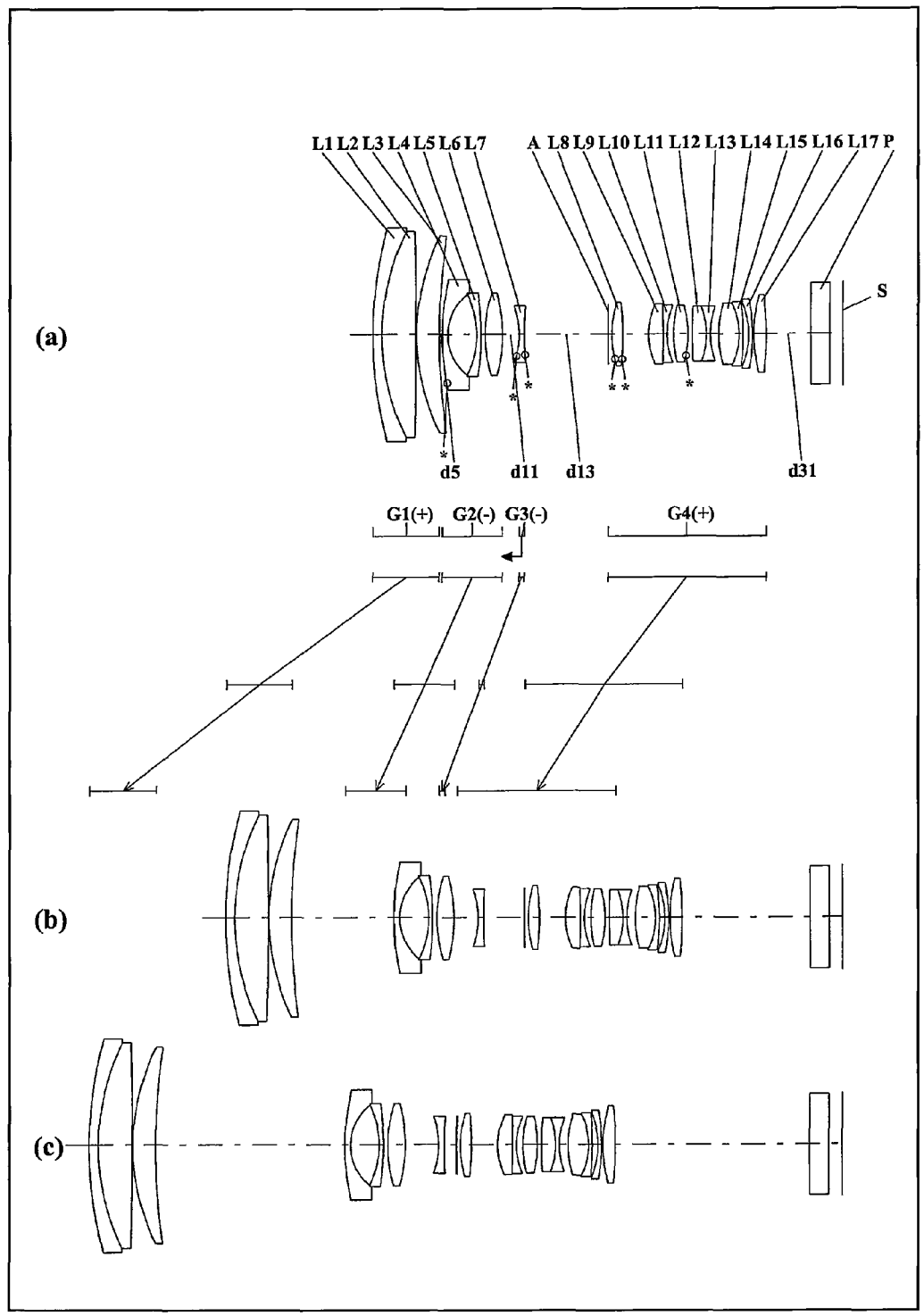
FIG. 13 is a lens arrangement diagram showing an infinity in-focus condition of a zoom lens system according to Embodiment 5 (Example 5)
Figure 14:
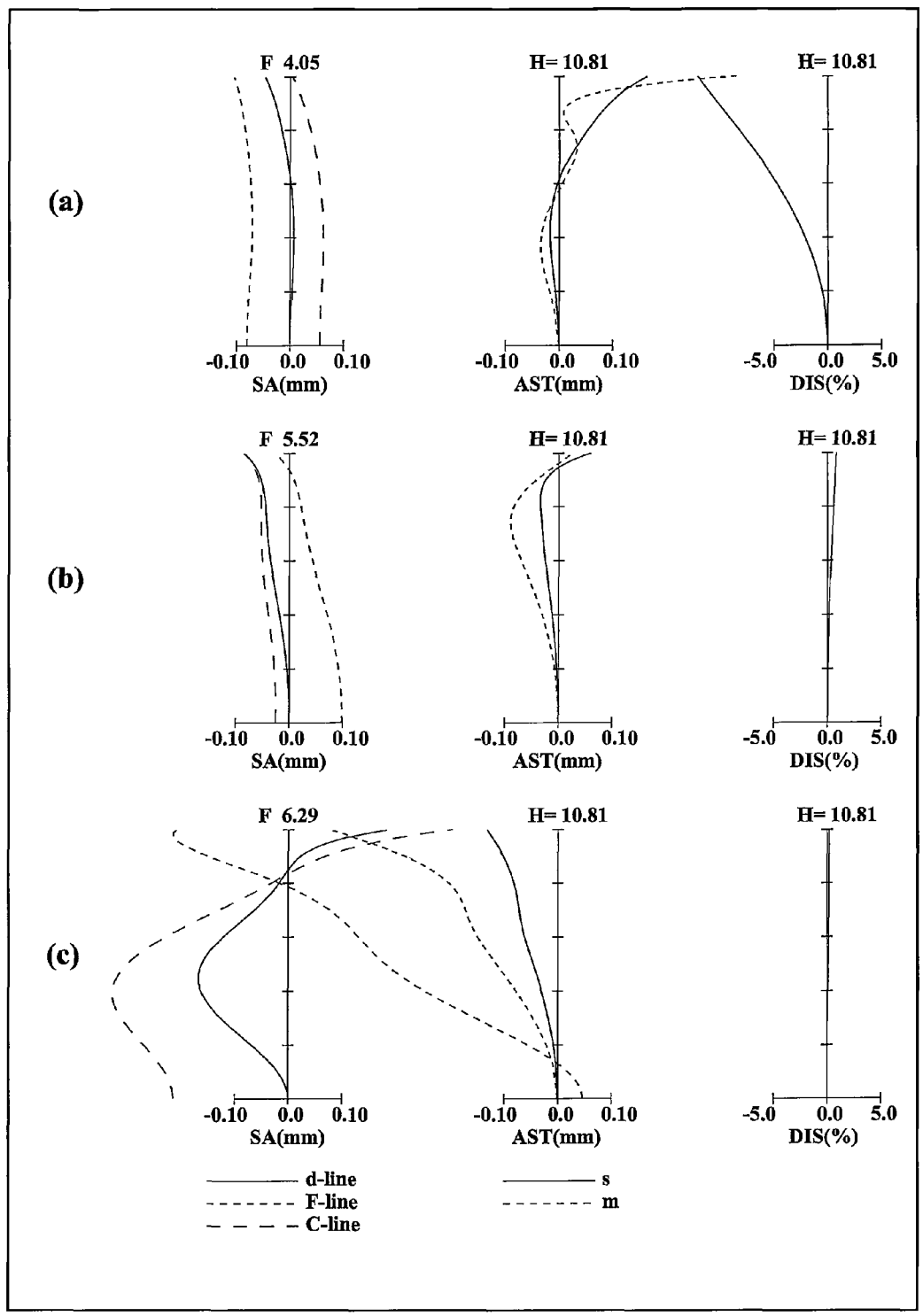
FIG. 14 is a longitudinal aberration diagram showing an infinity in-focus condition of a zoom lens system according to Example 5.
Figure 15:
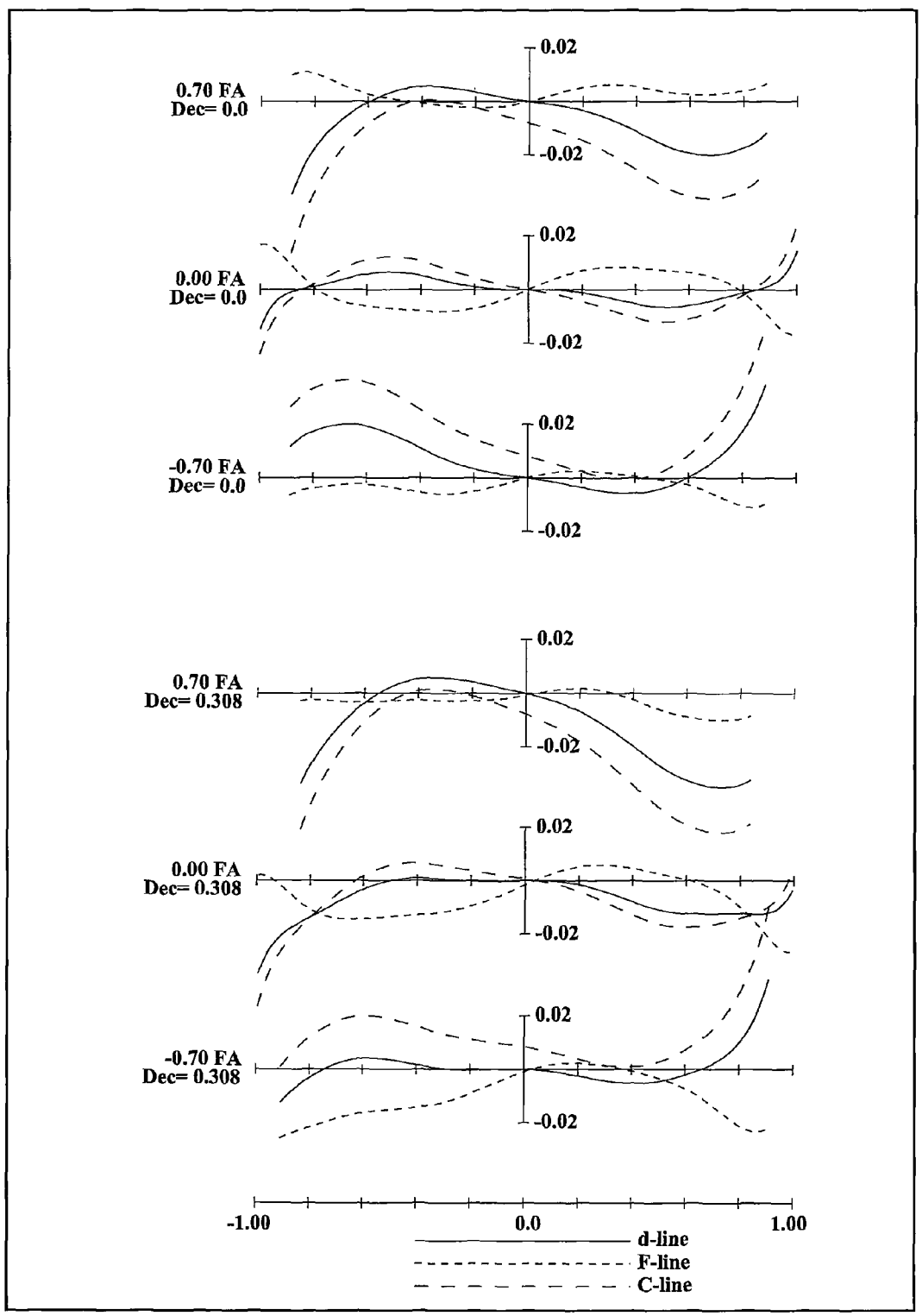
FIG. 15 is a lateral aberration diagram in a basic state where image blur compensation is not performed and in an image blur compensation state at a telephoto limit of a zoom lens system according to Example 5.

The zoom lens system of Numerical Example 5 corresponds to Embodiment 5 shown in FIG. 13. Data of the zoom lens system of Numerical Example 5, i.e., the surface data, the aspheric surface data, the various data, the lens element data, the zoom lens unit data, and the zoom lens unit magnification are shown in Tables 26, 27, 28, 29, 30, and 31, respectively.

TABLE 26

(surface data)

| Surface number | r | d | nd | vd |
|---|---|---|---|---|
| Object surface | ∞ | | | |
| 1 | 90.30820 | 1.93190 | 1.84666 | 23.8 |
| 2 | 50.87660 | 7.33030 | 1.49700 | 81.6 |
| 3 | −922.88540 | 0.15000 | | |
| 4 | 48.34930 | 4.89480 | 1.71700 | 47.9 |
| 5 | 147.06100 | Variable | | |
| 6* | 58.12980 | 1.20000 | 1.90681 | 21.2 |
| 7 | 11.31120 | 6.28100 | | |
| 8 | −19.38970 | 0.89450 | 1.88300 | 40.8 |
| 9 | −64.19440 | 0.91900 | | |
| 10 | 30.72250 | 3.72760 | 1.94595 | 18.0 |
| 11 | −33.35260 | Variable | | |
| 12* | −18.28890 | 1.20110 | 1.80420 | 46.5 |
| 13* | 109.11350 | Variable | | |
| 14(Aperture) | ∞ | 0.80610 | | |
| 15* | 23.54260 | 2.43820 | 1.69350 | 53.2 |
| 16* | −52.76110 | 5.60730 | | |
| 17 | 15.34600 | 3.22520 | 1.71300 | 53.9 |
| 18 | −197.48210 | 0.80880 | 2.00069 | 25.5 |
| 19 | 15.25880 | 1.47090 | | |
| 20 | 26.90540 | 3.11630 | 1.59201 | 67.0 |
| 21* | −22.34970 | 0.87140 | | |
| 22 | 97.11210 | 3.05020 | 1.80518 | 25.5 |
| 23 | −15.86630 | 0.80000 | 1.83481 | 42.7 |
| 24 | 16.64980 | 1.87130 | | |
| 25 | 23.47560 | 4.44630 | 1.49700 | 81.6 |
| 26 | −14.64800 | 0.80000 | 1.83481 | 42.7 |
| 27 | −60.20220 | 1.24930 | | |
| 28 | −17.34570 | 0.80000 | 1.72916 | 54.7 |
| 29 | −39.86110 | 0.28520 | | |
| 30 | 33.25040 | 2.68470 | 1.51680 | 64.2 |
| 31 | −73.57350 | Variable | | |
| 32 | ∞ | 4.20000 | 1.51680 | 64.2 |
| 33 | ∞ | BF | | |
| Image surface | ∞ | | | |

TABLE 27

(aspherical data)

| Surface No. | Parameters |
|---|---|
| 6 | K = −1.96414E+01, A4 = 2.17865E−05, A6 = −7.11149E−08, A8 = −4.34378E−10, A10 = 4.69717E−12, A12 = −1.54970E−14 |
| 12 | K = 0.00000E+00, A4 = −2.79093E−05, A6 = 2.00080E−06, A8 = −2.37691E−08, A10 = 1.26736E−11, A12 = 9.26223E−13 |
| 13 | K = 5.35969E+01, A4 = −4.04231E−05, A6 = 2.44155E−06, A8 = −5.15800E−08, A10 = 5.92811E−10, A12 = −2.81121E−12 |
| 15 | K = 0.00000E+00, A4 = −6.06935E−06, A6 = 3.73242E−08, A8 = −3.05202E−09, A10 = −7.46214E−11, A12 = −3.43954E−13 |
| 16 | K = 0.00000E+00, A4 = 2.56389E−05, A6 = −7.24066E−08, A8 = −4.48824E−10, A10 = −1.28984E−10, A12 = 6.18123E−15 |
| 21 | K = 0.00000E+00, A4 = 2.54758E−05, A6 = 9.61906E−08, A8 = 7.43701E−10, A10 = −3.39306E−13, A12 = 0.00000E+00 |

TABLE 28

(various data)
Zooming ratio 9.50927

|  | Wide | Middle | Telephoto |
|---|---|---|---|
| Focal length | 14.5133 | 44.3163 | 138.0113 |
| F-number | 4.05105 | 5.51642 | 6.29179 |
| View angle | 40.2948 | 13.6070 | 4.4736 |

TABLE 28-continued (various data)
Zooming ratio 9.50927

|  | Wide | Middle | Telephoto |
|---|---|---|---|
| Image height | 10.8150 | 10.8150 | 10.8150 |
| Overall length of lens system | 101.9105 | 133.8869 | 163.2443 |
| BF | 2.79643 | 2.82858 | 2.86373 |
| d5 | 0.6599 | 22.4056 | 41.2644 |
| d11 | 3.5868 | 5.1902 | 7.2600 |
| d13 | 18.1884 | 8.8136 | 2.7095 |
| d31 | 9.6176 | 27.5875 | 42.0853 |
| Entrance pupil position | 25.5492 | 80.6266 | 224.4799 |
| Exit pupil position | −36.1526 | −54.1225 | −68.6203 |
| Front principal point position | 34.6545 | 90.4583 | 96.0385 |
| Back principal point position | 87.3972 | 89.5705 | 25.2330 |

TABLE 29

(lens element data)

| Unit | Initial surface No. | Focal length |
|---|---|---|
| 1 | 1 | −140.7850 |
| 2 | 2 | 97.2626 |
| 3 | 4 | 98.4231 |
| 4 | 6 | −15.6783 |
| 5 | 8 | −31.7592 |
| 6 | 10 | 17.3976 |
| 7 | 12 | −19.3956 |
| 8 | 15 | 23.7846 |
| 9 | 17 | 20.0980 |
| 10 | 18 | −14.1277 |
| 11 | 20 | 21.1187 |
| 12 | 22 | 17.1444 |
| 13 | 23 | −9.6242 |
| 14 | 25 | 18.8798 |
| 15 | 26 | −23.3754 |
| 16 | 28 | −42.7558 |
| 17 | 30 | 44.6955 |

TABLE 30

(zoom lens unit data)

| Unit | Initial surface No. | Focal length | Length of lens unit | Front principal point position | Back principal point position |
|---|---|---|---|---|---|
| 1 | 1 | 76.52671 | 14.30700 | 3.39343 | 8.72110 |
| 2 | 6 | −81.54993 | 13.02210 | −25.94425 | −41.08891 |
| 3 | 12 | −19.39560 | 1.20110 | 0.09517 | 0.63333 |
| 4 | 14 | 19.08890 | 34.33120 | −0.71921 | 9.87207 |

TABLE 31

(zoom lens unit magnification)

| Unit | Initial surface No. | Wide | Middle | Telephoto |
|---|---|---|---|---|
| 1 | 1 | 0.00000 | 0.00000 | 0.00000 |
| 2 | 6 | −5.55698 | 11.53388 | 3.14509 |
| 3 | 12 | 0.03170 | −0.02486 | −0.20618 |
| 4 | 14 | −1.07671 | −2.01978 | −2.78111 |

The following Table 32 show values corresponding to the individual conditions in the zoom lens systems of the respective numerical examples.

TABLE 32

(corresponding values to individual conditions:
Numerical Examples 1 to 5)

| Condition | Numerical Example | | | | |
|---|---|---|---|---|---|
|  | 1 | 2 | 3 | 4 | 5 |
| (1) $f_{4A}/f_{4\alpha}$ | 0.86 | 0.86 | 0.85 | 0.82 | 0.87 |
| (2) $f_{4Ob}/f_{4\alpha}$ | 0.86 | 0.86 | 0.85 | 0.82 | 0.87 |
| (3) $f_{4B}/f_{4\alpha}$ | −1.22 | −1.22 | −1.29 | −1.14 | −1.22 |
| (4) $f_{4Im}/f_{4\alpha}$ | 4.03 | 4.00 | 4.21 | 4.07 | 4.38 |
| (5) $f_{4\alpha}/f_W$ | 1.34 | 1.34 | 1.33 | 1.40 | 1.32 |
| (6) $f_F/f_{4\alpha}$ | −1.09 | −1.09 | −1.15 | −1.26 | −1.02 |
| (7) $f_1*(f_T/f_W)/\sqrt{(f_W*f_T)}$ | 16.19 | 16.07 | 17.17 | 16.57 | 16.27 |
| (8) $f_2*(f_T/f_W)/\sqrt{(f_W*f_T)}$ | −9.90 | −9.86 | −10.06 | −7.26 | −17.34 |
| (9) $\delta t_1/f_1$ | 0.79 | 0.79 | 0.79 | 0.75 | 0.80 |
| (10) $\delta t_2/f_2$ | −0.42 | −0.40 | −0.43 | −0.48 | −0.25 |
| (11) $\delta t_3/f_3$ | −0.79 | −0.72 | −0.67 | −0.57 | −0.88 |
| (12) $\delta t_4/f_4$ | 1.67 | 1.59 | 1.65 | 1.56 | 1.70 |
| (13) $\beta_{2T}/\beta_{2W}$ | −5.34 | −4.91 | −5.90 | 28.67 | −0.57 |
| (14) $\beta_{3T}/\beta_{3W}$ | −0.68 | −0.76 | −0.63 | 0.13 | −6.44 |
| (15) $\beta_{4T}/\beta_{4W}$ | 2.57 | 2.49 | 2.63 | 2.53 | 2.58 |
| (16) $f_3*\beta_{3W}*\beta_{3W}/(\delta s_3*f_T/f_W)$ | 6.21 | 6.09 | 1.16 | 1.90 | −0.09 |
| (17) $DIS_W*f_T/f_W$ | −1.02 | −1.03 | −1.55 | −1.50 | −1.14 |
| (18) $nd_2$ | 1.904 | 1.904 | 1.904 | 1.904 | 1.912 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging device in a digital still camera, a digital video camera or the like that requires high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system, in order from an object side to an image side, comprising:
a first lens unit having positive optical power;
a second lens unit having negative optical power;
a third lens unit having negative optical power; and
a fourth lens unit having positive optical power, wherein
at the time of zooming, all lens units move in a direction along the optical axis such that intervals among respective lens units vary,
at the time of zooming, the third lens unit moves in the direction along the optical axis such that the interval between the second lens unit and the third lens unit is made longer at a telephoto limit than the interval at a wide-angle limit, and
the following conditions are satisfied:

$$-1.26 \leq =f_F/f_{4\alpha} < -0.7 \quad (6)$$

$$-20 < f_2*(f_T/f_W)/\sqrt{(f_W*f_T)} < -6 \quad (8)$$

where,
$f_F$ is a focal length of a focusing lens unit, and
$f_{4\alpha}$ is a composite focal length of the fourth lens unit and a lens unit subsequent thereto at a wide-angle limit,
$f_2$ is a focal length of the second lens unit,
$f_T$ is a focal length of an entire system at a telephoto limit, and $f_W$ is a focal length of the entire system at a wide-angle limit.

2. The zoom lens system as claimed in claim 1, wherein, at the time of zooming, all lens units monotonously moves along the optical axis toward the object side.

3. The zoom lens system as claimed in claim 1, satisfying the following condition:

$$-0.7 < \delta t_2/f_2 < -0.2 \quad (10)$$

where,
$\delta t_2$ is an amount of movement of the second lens unit from a wide-angle limit to a telephoto limit (where, the position of the wide-angle limit is set as a reference, and expansion to the object side from the reference position is regarded as a positive value), and
$f_2$ is a focal length of the second lens unit.

4. The zoom lens system as claimed in claim 1, satisfying the following condition:

$$12 < f_1 * (f_T/f_W)/\sqrt{(f_W * f_T)} < 27 \quad (7)$$

where,
$f_1$ is a focal length of the first lens unit,
$f_T$ is a focal length of an entire system at a telephoto limit, and
$f_W$ is a focal length of the entire system at a wide-angle limit.

5. The zoom lens system as claimed in claim 1, satisfying the following condition:

$$0.5 < \delta t_1/f_1 < 1.1 \quad (9)$$

where,
$\delta t_1$ is an amount of movement of the first lens unit from a wide-angle limit to a telephoto limit (where, the position of the wide-angle limit is set as a reference, and expansion to the object side from the reference position is regarded as a positive value), and
$f_1$ is a focal length of the first lens unit.

6. The zoom lens system as claimed in claim 1, satisfying the following condition:

$$-1.2 < \delta t_3/f_3 < -0.4 \quad (11)$$

where,
$\delta t_3$ is an amount of movement of the third lens unit from a wide-angle limit to a telephoto limit (where, the position of the wide-angle limit is set as a reference, and expansion to the object side from the reference position is regarded as a positive value), and
$f_3$ is a focal length of the third lens unit.

7. The zoom lens system as claimed in claim 1, satisfying the following condition:

$$1.2 < \delta t_4/f_4 < 2.0 \quad (12)$$

where,
$\delta t_4$ is an amount of movement of the fourth lens unit from a wide-angle limit to a telephoto limit (where, the position of the wide-angle limit is set as a reference, and expansion to the object side from the reference position is regarded as a positive value), and
$f_4$ is a focal length of the fourth lens unit.

8. The zoom lens system as claimed in claim 1, satisfying the following condition:

$$-25 < \beta_{2T}/\beta_{2W} < 34 \quad (13)$$

where,
$\beta_{2T}$ is paraxial imaging magnification of the second lens unit at a telephoto limit, and
$\beta_{2W}$ is paraxial imaging magnification of the second lens unit at a wide-angle limit.

9. The zoom lens system as claimed in claim 1, satisfying the following condition:

$$-8 < \beta_{3T}/\beta_{3W} < 0.2 \quad (14)$$

where,
$\beta_{3T}$ is paraxial imaging magnification of the third lens unit at a telephoto limit, and
$\beta_{3W}$ is paraxial imaging magnification of the third lens unit at a wide-angle limit.

10. The zoom lens system as claimed in claim 1, satisfying the following condition:

$$2 < \beta_{4T}/\beta_{4W} < 3.2 \quad (15)$$

where,
$\beta_{4T}$ is paraxial imaging magnification of the fourth lens unit at a telephoto limit, and
$\beta_{4W}$ is paraxial imaging magnification of the fourth lens unit at a wide-angle limit.

11. The zoom lens system as claimed in claim 1, satisfying the following condition:

$$-0.3 < f_F * \beta_{FW} * \beta_{FW}/(\delta s_F * f_T/f_W) < 7.0 \quad (16)$$

where,
$f_F$ is a focal length of a focusing lens unit,
$\beta_{FW}$ is paraxial imaging magnification of the focusing lens unit at a wide-angle limit,
$\delta s_F$ is an amount of distortion of an aspheric surface at a height of 0.5*f.sub.W*tan .omega..sub.W from an optical axis, the aspheric surface being arranged closest to the object side in the focusing lens unit,
$f_T$ is a focal length of an entire system at a telephoto limit,
$f_W$ is a focal length of the entire system at a wide-angle limit, and
$\omega_W$ is a half view angle at a wide-angle limit.

12. The zoom lens system as claimed in claim 1, satisfying the following condition:

$$-1.7 < DIS_W * f_T/f_W < -0.5 \quad (17)$$

where,
$DIS_W$ is an amount of distortion of a maximum image height at a wide-angle limit,
$f_T$ is a focal length of an entire system at a telephoto limit, and
$f_W$ is a focal length of the entire system at a wide-angle limit.

13. An interchangeable lens apparatus, comprising:
a zoom lens system; and
a mount section detachably connected to a camera body that includes an image sensor which receives an optical image formed by the zoom lens system thereby to convert the optical image to an electrical image signal, wherein
the zoom lens system, in order from an object side to an image side, includes:
a first lens unit having positive optical power;
a second lens unit having negative optical power;
a third lens unit having negative optical power; and
a fourth lens unit having positive optical power, wherein
at the time of zooming, all lens units move in a direction along the optical axis such that intervals among respective lens units vary,
at the time of zooming, the third lens unit moves in the direction along the optical axis such that the interval between the second lens unit and the third lens unit is made longer at a telephoto limit than the interval at a wide-angle limit, and the following conditions are satisfied:

$$-1.26 <= f_F/f_{4\alpha} < -0.7 \quad (6)$$

$$-20 < f_2*(f_T/f_W)/\sqrt{(f_W*f_T)} < -6 \quad (8)$$

where,
$f_F$ is a focal length of a focusing lens unit, and
$f_{4\alpha}$ is a composite focal length of the fourth lens unit and a lens unit subsequent thereto at a wide-angle limit,
$f_2$ is a focal length of the second lens unit,
$f_T$ is a focal length of an entire system at a telephoto limit, and
$f_W$ is a focal length of the entire system at a wide-angle limit.

14. A camera system, comprising:
an interchangeable lens apparatus that includes a zoom lens system; and
a camera body which is connected to the interchangeable lens apparatus via a camera mount section in an attachable and removable manner and includes an image sensor which receives an optical image formed by the zoom lens system thereby to convert the optical image to an electrical image signal, wherein
the zoom lens system, in order from an object side to an image side, includes:
a first lens unit having positive optical power;
a second lens unit having negative optical power;
a third lens unit having negative optical power; and
a fourth lens unit having positive optical power, wherein
at the time of zooming, all lens units move in a direction along the optical axis such that intervals among respective lens units vary,
at the time of zooming, the third lens unit moves in the direction along the optical axis such that the interval between the second lens unit and the third lens unit is made longer at a telephoto limit than the interval at a wide-angle limit, and
the following conditions are satisfied:

$$-1.26 <= f_F/f_{4\alpha} < -0.7 \quad (6)$$

$$-20 < f_2*(f_T/f_W)/\sqrt{(f_W*f_T)} < -6 \quad (8)$$

where,
$f_F$ is a focal length of a focusing lens unit, and
$f_{4\alpha}$ is a composite focal length of the fourth lens unit and a lens unit subsequent thereto at a wide-angle limit,
$f_2$ is a focal length of the second lens unit,
$f_T$ is a focal length of an entire system at a telephoto limit, and
$f_W$ is a focal length of the entire system at a wide-angle limit.

* * * * *